United States Patent
He et al.

(10) Patent No.: US 12,491,704 B2
(45) Date of Patent: Dec. 9, 2025

(54) MULTI-LAYERED OPTICAL DEVICES

(71) Applicant: Covestro (Netherlands) B.V., Geleen (NL)

(72) Inventors: Meng He, South Elgin, IL (US);
Thomas Fauvell, Chicago, IL (US);
Eric Urruti, Elgin, IL (US)

(73) Assignee: Covestro (Netherlands) B.V., Geleen (NL)

( * ) Notice: Subject to any disclaimer, the term of this patent is extended or adjusted under 35 U.S.C. 154(b) by 543 days.

(21) Appl. No.: 17/913,682

(22) PCT Filed: Mar. 31, 2021

(86) PCT No.: PCT/US2021/025047
§ 371 (c)(1),
(2) Date: Sep. 22, 2022

(87) PCT Pub. No.: WO2021/202638
PCT Pub. Date: Oct. 7, 2021

(65) Prior Publication Data
US 2023/0116356 A1    Apr. 13, 2023

Related U.S. Application Data

(60) Provisional application No. 63/004,560, filed on Apr. 3, 2020.

(51) Int. Cl.
| | | |
|---|---|---|
| *C08G 18/83* | (2006.01) |
| *B32B 1/00* | (2024.01) |
| *B32B 15/08* | (2006.01) |
| *B32B 17/10* | (2006.01) |
| *B32B 27/08* | (2006.01) |
| *B32B 27/18* | (2006.01) |

(52) U.S. Cl.
CPC .. *B32B 17/10036* (2013.01); *B32B 17/10559* (2013.01); *B32B 17/1077* (2013.01); *B32B 2250/03* (2013.01); *B32B 2250/40* (2013.01); *B32B 2307/412* (2013.01); *B32B 2307/762* (2013.01); *B32B 2315/08* (2013.01); *B32B 2375/00* (2013.01)

(58) Field of Classification Search
None
See application file for complete search history.

(56) References Cited

U.S. PATENT DOCUMENTS

| | | |
|---|---|---|
| 3,004,896 A | 10/1961 | Heller et al. |
| 3,055,896 A | 9/1962 | Boyle et al. |
| 3,072,585 A | 1/1963 | Milionis et al. |
| 3,074,910 A | 1/1963 | Dickson, Jr. |
| 3,189,615 A | 6/1965 | Heller et al. |
| 3,218,332 A | 11/1965 | Heller et al. |
| 3,230,194 A | 1/1966 | Boyle |
| 4,127,586 A | 11/1978 | Rody et al. |
| 4,218,500 A | 8/1980 | Radisch |
| 4,226,763 A | 10/1980 | Dexter et al. |
| 4,275,004 A | 6/1981 | Winter et al. |
| 4,278,589 A | 7/1981 | Dexter et al. |
| 4,315,848 A | 2/1982 | Dexter et al. |
| 4,324,744 A | 4/1982 | Lechtken et al. |
| 4,347,180 A | 8/1982 | Winter et al. |
| 4,383,863 A | 5/1983 | Dexter et al. |
| 4,675,352 A | 6/1987 | Winter et al. |
| 4,681,905 A | 7/1987 | Kubota et al. |
| 4,737,593 A | 4/1988 | Ellrich et al. |
| 4,753,817 A | 6/1988 | Meixner et al. |
| 4,853,471 A | 8/1989 | Rody et al. |
| 5,013,768 A | 5/1991 | Kiriyama et al. |
| 5,229,253 A | 7/1993 | Zertani et al. |
| 5,268,450 A | 12/1993 | Deslauriers et al. |
| 5,278,314 A | 1/1994 | Winter et al. |
| 5,280,124 A | 1/1994 | Winter et al. |
| 5,319,091 A | 6/1994 | Deslauriers et al. |
| 5,410,071 A | 4/1995 | Deslauriers et al. |
| 5,436,349 A | 7/1995 | Winter et al. |
| 5,516,914 A | 5/1996 | Winter et al. |
| 5,534,559 A | 7/1996 | Leppard et al. |
| 5,554,760 A | 9/1996 | Winter et al. |

(Continued)

FOREIGN PATENT DOCUMENTS

| | | |
|---|---|---|
| CN | 104356338 A | 2/2015 |
| CN | 105860017 A | 8/2016 |

(Continued)

OTHER PUBLICATIONS

Heinzmann, et al., Macromolecules 48 (2015) 8128-8136 (Year: 2015).*

(Continued)

*Primary Examiner* — Sheeba Ahmed
(74) *Attorney, Agent, or Firm* — Donald R. Palladino

(57) ABSTRACT

Disclosed herein are multi-layered optical devices including a polymeric layer disposed between and in contact with a first optical element layer and a second optical element layer, wherein the polymeric layer comprises a product of a composition comprising a self-healing component, wherein said self-healing component consists of or consists essentially of molecules comprising selfhealing moieties, wherein said composition possesses either: (a) greater than 30 wt. %, relative to the weight of the entire composition, of the self-healing component; or (b) greater than 0.015 equivalents of self-healing moieties per 100 g of the composition.

20 Claims, 1 Drawing Sheet

(56) References Cited

U.S. PATENT DOCUMENTS

| | | | |
|---|---|---|---|
| 5,563,242 | A | 10/1996 | Winter et al. |
| 5,574,166 | A | 11/1996 | Winter et al. |
| 5,607,987 | A | 3/1997 | Winter et al. |
| 5,907,023 | A | 5/1999 | Chawla |
| 5,942,290 | A | 8/1999 | Leppard et al. |
| 5,977,219 | A | 11/1999 | Ravichandran et al. |
| 6,020,528 | A | 2/2000 | Leppard et al. |
| 6,020,529 | A | 2/2000 | Fremy |
| 6,048,660 | A | 4/2000 | Leppard et al. |
| 6,166,218 | A | 12/2000 | Ravichandran et al. |
| 6,486,226 | B2 | 11/2002 | Al-Akhdar et al. |
| 6,486,228 | B2 | 11/2002 | Koehler et al. |
| 6,596,445 | B1 | 7/2003 | Matsumoto et al. |
| 6,825,243 | B2 | 11/2004 | Ohno et al. |
| 7,067,564 | B2 | 6/2006 | Bulters et al. |
| 7,622,131 | B2 | 11/2009 | Bosman et al. |
| 9,708,442 | B1 | 7/2017 | Kwisnek et al. |
| 11,548,962 | B2 | 1/2023 | Suh et al. |
| 2010/0076147 | A1 | 3/2010 | Hoorne-Van Gemert et al. |
| 2014/0099063 | A1 | 4/2014 | Steeman et al. |
| 2019/0224949 | A1* | 7/2019 | Li ............... B32B 17/10963 |
| 2020/0017706 | A1 | 1/2020 | Matthews |

FOREIGN PATENT DOCUMENTS

| | | |
|---|---|---|
| CN | 106589287 A | 4/2017 |
| CN | 107325256 A | 11/2017 |
| JP | 2003084102 A | 3/2003 |
| JP | 2013184396 A | 9/2013 |
| WO | 2010128007 A | 11/2010 |
| WO | 2017077839 A1 | 5/2017 |
| WO | 2017173296 A1 | 10/2017 |

OTHER PUBLICATIONS

Gao, et al., Progress in Organic Coatings 113 (2017) 160-167 (Year: 2017).*
International Search Report in PCT/US2021/025047, mailed Jul. 19, 2021.
Lewis, David F.V., "Hydrogen Bonding in Human P450-Substrate Interactions: A Major Contribution to Binding Affinity," The Scientific World, Dec. 2004, vol. 4, pp. 1074-1082.
Sevier et al., "Formation and Transfer of Disulphide Bonds In Living Cells," Nature Reviews, Nov. 2002, vol. 3, pp. 836-847.
U.S. Appl. No. 60/498,848, filed Aug. 29, 2003, Sitzmann et al, Ciba Specialty Chemicals Corporation, 25 pages.

* cited by examiner

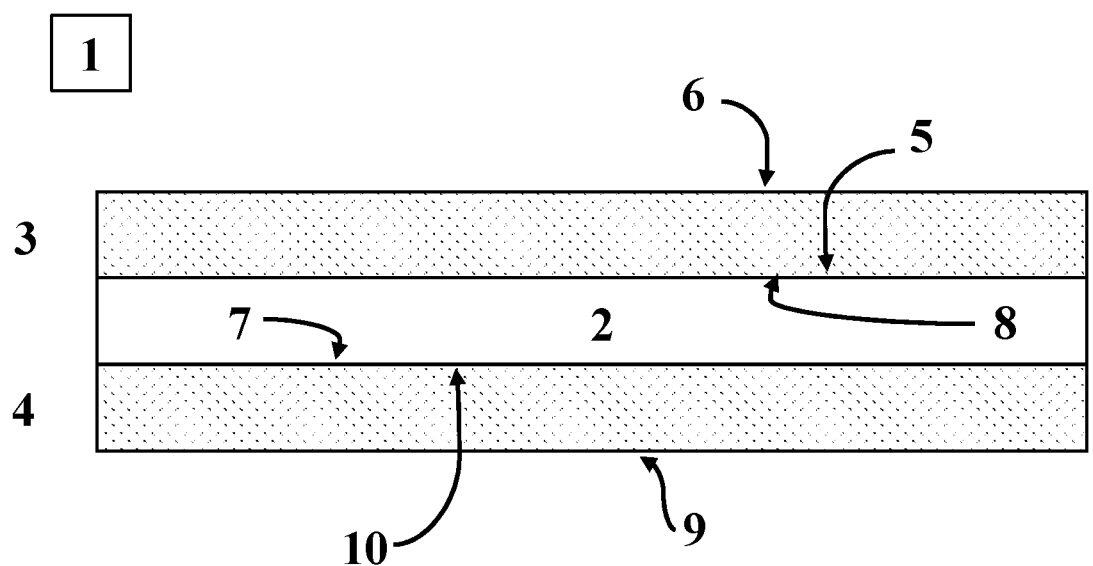

MULTI-LAYERED OPTICAL DEVICES

TECHNICAL FIELD

The present invention relates to multi-layered optical devices having at least one polymeric layer capable of imparting self-healing properties and/or stress-relaxation behavior into said multi-layered optical device, the compositions from which said polymeric layer are created, and the cured products produced therefrom.

CROSS REFERENCE TO RELATED APPLICATIONS

This application is a national stage application under 35 U.S.C. § 371 of PCT/US2021/025047, filed 31 Mar. 2021, which claims the benefit of U.S. Provisional Application No. 63/004,560, filed 3 Apr. 2020, each of which is hereby incorporated by reference in its entirety as if fully set forth herein.

BACKGROUND

An optical device is an apparatus which processes or manipulates electromagnetic radiation, typically in the visible and/or UV portions of the spectrum. There are many kinds of optical devices, such as eyeglasses, binoculars, lasers, microscopes, telescopes, cameras, and optical fibers.

In many applications, optical devices endure a significant amount of physical and/or thermal stresses during installation and use which tend to degrade their performance over time. For example, in an optical fiber application, forces which involve the local axial displacement of the glass over a few micrometers can cause microscopic curvatures, or microbends. Microbends are known to contribute to an attenuation of an optical fiber's signal transmission. This reduces the efficiency with which large amounts of data can be transmitted over large distances. Over time, the protective polymeric coating layers which surround and directly contact a glass fiber have been engineered to become softer, as it is known that softer coatings can better cushion stresses and minimize microbend formation in an optical fiber. However, an undesirable byproduct of such softer coatings is that they are more prone to damage caused via physical handling and thermal stresses during application, installation, and over time in-situ. Such damage often manifests in the form of voids, or cavitations, into the polymeric layers which protect the glass fiber. This, too, increases the attenuation levels in an optical fiber.

More examples of multilayer structured products include the ones used for optical parts, such as beam splitters, solar panels, antireflection coatings, displays, lenses, optical films, polarizing optics, mirrors, windows, optical filters, light device, etc. The external mechanical stress and the repeated temperature cycling experienced during lifetime of usage can cause the different layer of structures to delaminate or crack or craze, thereby reducing performance or causing failure.

Another example of an optical device is a photochromic lens. Such lenses, which have the tendency to darken in response to an exposure of light of prescribed wavelength(s) and/or intensities, are used in the eyewear industry as a means of providing a single device which dynamically and simultaneously offers the benefits of both sunglasses and traditional glasses. Photochromic lenses are often comprised of a glass or polymeric lens plus one or more coating or film layers adhered thereto, wherein at least one of the coating or film layers include the photochromic molecules necessary to accommodate the intended dynamic effects. The darkening and color fading behavior is controlled not only by photochromic dyes, but also by the properties of host material where the dyes are located. When dyes switch between colored form and non-colored form, volume of molecules change so local stress build up and stress patten change around dye molecules is expected in both ways. The level of local stress build up and how local stress change is distributed will have a significant impact to lens performance, such as the darkness of lens after activation and how fast the lens color bleach back to clear.

It would be desirable, therefore, to provide for multi-layered optical devices which are better able to withstand or equilibrate stress differentials placed upon or between the multiple associated layers, or internal stress within the layer. It would additionally or alternatively be desirable to provide a multi-layered optical device which offers an amount (or an improved amount) of self-healing, such that damage actually incurred on one or more of the layers might be reduced or eliminated over time.

BRIEF SUMMARY

One or more of the aforementioned solutions may be provided by several aspects and embodiments of the invention described and claimed herein. A first aspect is a composition for coating a multi-layered optical device including an optional reactive monomer and/or optional reactive oligomer component; a self-healing component consisting of molecules possessing one or more self-healing moieties and optionally one or more polymerizable moieties; an initiator component; and an optional additive component; wherein (a) the self-healing component is present, relative to the weight of the entire composition, in an amount greater than 30 wt. %, and/or (b) the composition possesses greater than 0.015 equivalents of self-healing moieties per 100 g of the composition, or from 0.015 to 0.2 equivalents, or from 0.015 to 0.1 equivalents, or from 0.015 to 0.08 equivalents, or from 0.015 to 0.05 equivalents, or from 0.015 to 0.045 equivalents; or from 0.02 to 0.2 equivalents, or from 0.02 to 0.1 equivalents, or from 0.02 to 0.08 equivalents, or from 0.02 to 0.05 equivalents; or from 0.025 to 0.20 equivalents; or from 0.037 to 0.2 equivalents, or from 0.037 to 0.1 equivalents, or from 0.037 to 0.08 equivalents, or from 0.037 to 0.05 equivalents.

According to other embodiments of the first aspect, the composition possesses polymerizable moieties, such as (meth)acrylate moieties, and/or the self-healing moieties can include multi-hydrogen bonding groups, disulfide groups, or urea groups. In some embodiments, the self-healing moieties possess certain specified bond energies between two bonded self-healing moieties. In yet another embodiment of the first aspect, the self-healing moiety includes 2-ureido-4-pyrimidinone (UPy) group(s) and/or at least three urethane linking groups. In still further embodiments, the entire composition and/or the self-healing component specifically possesses specified values of equivalents of UPy groups or (meth)acrylate groups per 100 g of the composition.

In another embodiment of the first aspect, the self-healing component includes molecule(s) according to certain specified structures, such as structure (VI) referenced elsewhere herein. In select embodiments of the first aspect, the self-healing component and/or the molecules according to certain specified structures—such as structure (VI) referenced elsewhere herein, possess specified glass transition temperatures, molecular weight values, and/or specific reactants. In yet other embodiments, the composition possesses specified viscosity values and/or quantities of monomers, oligomers, self-healing components, (photo)initiators, and/or additives.

In still further embodiments of the first aspect, the composition is configured to possess, when presented as a cured product such as a film, certain self-healing properties, as evidenced by a comparison of certain measured mechanical properties both before and after a cut or tear has been applied to the cured product.

A second aspect of the current invention is a self-healing oligomer according to the following structure (VII):

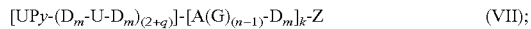

wherein
UPy represents a UPy group, wherein the UPy group is a 2-ureido-4-pyrimidinone;
U represents —NHC(O)E- or -EC(O)NH—, wherein E is O, NH, N(alkyl), or S;
q is a number greater than or equal to 0 and less than or equal to 10;
k is a number from 0 to 20;
A is selected from carbon and nitrogen;
n is 2 or 3, wherein when A is an sp3 carbon, n=3, and when A is an sp2 carbon or a nitrogen, n=2;
m is an integer from 0 to 500;
D is, for each occurrence of m, a divalent spacer independently chosen from —O—, —C(O)—, -Aryl-, —C≡C—, —N=N—, —S—, —S(O)—, —S(O)(O)—, —(CT$_2$)—, —N(T)=, —Si(T)$_2$(CH$_2$)—, —(Si(T)$_2$O)—, —C(T)=C(T)-, —C(T)=N—, —C(T)=, —N=, or combinations thereof,
wherein
for each instance in D of a single bond, a single bond is connected thereto, and for each instance in D of a double bond, a double bond is connected thereto;
wherein
each T is selected for each occurrence from single valent units including hydrogen, F, Cl, Br, I, C$_1$-C$_8$ alkyl, C$_1$-C$_8$ alkoxy, substituted amino, or substituted aryl;
wherein each T can also be selected from divalent D$_m$ and connects to another divalent T that's also selected from D$_m$ and form a ring structure; and
and i is an integer from 1-40;
Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylate, hydrogen, F, Cl, Br, I, or maleimido group; and
G is, for each occurrence of n, independently selected from hydrogen, —D$_m$-Z, or a self-healing moiety according to the following structure (VII-b):

wherein
X is a multi-hydrogen bonding group, a disulfide group, or a urea group;
j=1 when X is divalent, and j=0 when X is monovalent; and
wherein the oligomer possesses greater than 0.022, or greater than 0.025, or greater than 0.03, or greater than 0.04, or greater than 0.05, or greater than 0.1 equivalents of UPy groups per 100 grams of the oligomer.

According to other embodiments of the second aspect, the oligomer according to structure (VII) is present in a composition, preferably a liquid radiation curable composition, for coating a multi-layered optical device, such as a primary coating layer of an optical fiber.

A third aspect of the current invention is a multi-layered optical device comprising: a polymeric layer disposed between a first optical element layer and a second optical element layer,
wherein each of the polymeric layer, the first optical element layer, and the second optical element layer comprise a first surface and a second surface, wherein the first surface of the polymeric layer is in contact with the first surface of the first optical element layer and the second surface of the polymeric layer is in contact with the first surface of the second optical element layer,
wherein the polymeric layer comprises a product of a composition comprising a self-healing component, wherein said self-healing component consists of molecules comprising self-healing moieties, wherein said composition possesses either:
(a) greater than 30 wt. %, relative to the weight of the entire composition, of the self-healing component; or
(b) greater than 0.015 equivalents of self-healing moieties per 100 g of the composition.

BRIEF DESCRIPTION OF THE DRAWINGS

FIG. 1 depicts the layout of a multi-layered optical article according to a non-limiting embodiment of the current invention.

DETAILED DESCRIPTION

A first aspect of the current invention is a composition for coating a multi-layered optical device comprising:
optionally, a reactive monomer and/or oligomer component;
a self-healing component consisting of molecules possessing one or more self-healing moieties and optionally one or more polymerizable moieties;
an initiator component; and
optionally, an additive component;
wherein (a) the self-healing component is present, relative to the weight of the entire composition, in an amount greater than 30 wt. %, or greater than 40 wt. %, or greater than 50 wt. %, or greater than 60 wt. %, or greater than 70 wt. %, or greater than 80 wt. %; and/or
(b) the composition possesses greater than 0.015 equivalents of self-healing moieties per 100 g of the composition, or from 0.015 to 0.2 equivalents, or from 0.015 to 0.1 equivalents, or from 0.015 to 0.08 equivalents, or from 0.015 to 0.05 equivalents, or from 0.015 to 0.045 equivalents; or from 0.02 to 0.2 equivalents, or from 0.02 to 0.1 equivalents, or from 0.02 to 0.08 equivalents, or from 0.02 to 0.05 equivalents; or from 0.025 to 0.20 equivalents; or from 0.037 to 0.2 equivalents, or from 0.037 to 0.1 equivalents, or from 0.037 to 0.08 equivalents, or from 0.037 to 0.05 equivalents.

Compositions according to the first aspect are curable, that is, they are capable of forming chemical reactions, preferably polymerization reactions, to effect solidification or curing of the composition upon sufficient exposure to a sufficient stimulus. Such a stimulus could be via application of heat (thereby making the composition thermally curable) or actinic radiation of a sufficient dose and appropriate wavelength (thereby making the composition radiation curable). According to various embodiments, such compositions may include an optional reactive monomer component, an optional oligomer component, a self-healing component, an initiator component, and an optional additive component. Such components, which are described in more detail below, may equally be employed as appropriate in other aspects of the current invention, such as any of the compositions for coating a multi-layered optical device according to the first aspect, for use with any of the self-healing oligomers according to the second aspect, and the multi-layered optical devices according to the third aspect.

Monomer Component

Compositions according to the first aspect of the present invention optionally include a monomer component; that is, a collection of one or more than one individual monomers having one or more than one specified structure or type. A monomer is a molecule of low relative molecular mass, the structure of which can undergo polymerization thereby contributing constitutional units to the essential structure of a macromolecule. In an embodiment, the monomer component consists of one or more monomers having a theoretical molecular weight ($MW_{theo}$) from about 86 g/mol to about 800 g/mol, or from 100 g/mol to 350 g/mol, wherein $MW_{theo}$ is determined by calculating the theoretical molecular weight of the ideal structure (often represented by a corresponding CAS #) of the monomer used. For purposes herein, an individual monomer shall be construed to be part of the monomer component unless it possesses a self-healing moiety as described elsewhere herein; in such case, it shall be construed to be part of the self-healing component.

Monomers are typically utilized in multi-layered optical device compositions as a diluent. That is, they may be employed to change—and more specifically, typically reduce—the viscosity of the greater composition into which they are added. A variety of diluents are used to maximize the flowability, and in turn the processability, of the multi-layered optical device compositions with which they are associated.

In addition to merely changing the viscosity of the liquid composition, such monomers are preferably also utilized to contribute to the cure speed and/or physical properties of the coatings produced therefrom. As such, the monomers are typically reactive monomers. As used herein, "reactive" means the ability to form a chemical reaction, preferably a polymerization reaction, with another molecule. As such, a reactive compound will be said to possess at least one reactive, or functional group. When used for such purposes, the monomers will be said to possess at least one reactive, or functional, group. It is preferred that such reactive or functional group is a polymerizable group. If used, the monomer component preferably comprises, consists of, or consists essentially of reactive monomers or reactive diluent monomers.

In an embodiment, the monomer component according to the invention comprises, consists essentially of, or consists of reactive monomers having at least one polymerizable group. In a preferred embodiment, the monomer component consists of reactive monomers having, on average, one polymerizable group. The polymerizable group(s) of the reactive monomer are preferably able to (co)polymerize with other polymerizable groups present in the composition, such as those present in the self-healing component and/or the optional oligomer component.

The polymerizable groups of the reactive diluent may be of any known type. In an embodiment, however, the polymerizable group may comprise, consist essentially of, or consist of, for example, acrylate, methacrylate, acrylamide, or N-vinyl amide groups, or any combination thereof. The reactive diluents are preferably ethylenically unsaturated polymerizable compounds that contain at least one reactive olefinic double bond.

The polymerizable group(s) may occur at any feasible point along the length of the monomer. In a preferred embodiment, however the polymerizable groups comprise, consist essentially of, or consist of polymerizable end-groups.

The monomer component according to the present invention may include any known type of compound or substance consistent with the definitions specified elsewhere herein. In a preferred embodiment, however, the monomer comprises, consists essentially of, or consists of one or more reactive diluent monomers containing one double bond.

Typical examples of such monomers containing one double bond are alkyl or hydroxyalkyl acrylates, for example methyl, ethyl, butyl, 2-phenoxy ethyl, 2-ethylhexyl, 2-(2-ethoxyethoxy)ethyl acrylate (EOEOEA), and 2-hydroxyethyl acrylate, isobornyl acrylate, methyl and ethyl acrylate, lauryl-acrylate, ethoxylated nonyl-phenol acrylate, and diethylene-glycol-ethyl-hexyl acylate (DEGEHA). Methacrylated versions of such monomers are also available as appropriate. Further examples of monomers are acrylonitrile, acrylamide, N-substituted acrylamides, vinyl esters such as vinyl acetate, styrene, alkylstyrenes, halostyrenes, N-vinylpyrrolidone, N-vinyl caprolactam, vinyl chloride and vinylidene chloride.

Examples of monomers containing more than one double bond are ethylene glycol diacrylate, propylene glycol diacrylate, tripropylene glycol diacrylate, neopentyl glycol diacrylate, hexamethylene glycol diacrylate, bisphenol A diacrylate, 4,4'-bis(2-acryloyloxyethoxy) diphenylpropane, trimethylolpropane triacrylate, pentaerythritol triacrylate and tetraacrylate, and vinyl acrylate.

In an embodiment, the monomer component comprises, consists essentially of, or consists of one or more monofunctional monomers. As used herein, "monofunctional" means possession of an average of between 0.5 to 1.4 polymerizable groups per molecule, as determined by an NMR method. In a preferred embodiment, the monomer component comprises, consists of, or consists essentially of functional monomers, such as (meth)acrylic monomers.

One or more of the aforementioned monomers can be employed in compositions according to the present invention in any suitable amount as desired to, for example, tune the cure speed or viscosity of the formulation with which they are associated to be suitable for the production process, such as an optical fiber coating process, to be used therewith according to methods well-known in the art to which this invention applies, and may be chosen singly or in combination of one or more of the types enumerated herein. In an embodiment, the monomer component consists of a single monomer type. In another embodiment, the monomer component consists of more than one monomer types. Whether one or more than one different monomers are used, in an embodiment, the monomer component is present in an amount, relative to the entire weight of the radiation curable composition, from 10 wt. % to 65 wt. %, or from 10 wt. % to 55 wt. %, or from 10 wt. % to 50 wt. %, or from 10 wt. % to 40 wt. %, or from 10 wt. % to 30 wt. %; or from 20 wt. % to 65 wt. %, or from 20 wt. % to 55 wt. %, or from 20 wt. % to 50 wt. %, or from 20 wt. % to 40 wt. %.

Oligomer Component

Compositions according to the present invention optionally also include an oligomer component; that is, a collection of one or more than one individual oligomers having one or more than one specified structure or type. An oligomer is used herein to mean a molecule of intermediate relative molecular mass, the structure of which comprises a plurality of units derived, actually or conceptually, from molecules of lower relative molecular mass. As used herein, a component is considered an oligomer if it further possesses an $MW_{theo}$ value from about 1000 g/mol to about 100,000 g/mol, wherein $MW_{theo}$ is determined by calculating the theoretical molecular weight of the ideal structure oligomer used. For purposes herein, an individual oligomer shall be construed to be part of the oligomer component unless it possesses a self-healing moiety as described elsewhere herein; in such case, it shall be construed to be part of the self-healing component.

In an embodiment, if used, the oligomer component comprises, consists of, or consists essentially one or more oligomers having a theoretical molecular weight of at least 2000 grams per mol (g/mol), or at least 3000 g/mol, or at least 4000 g/mol, or from 2000 to 15000 g/mol, or from 2000 to 13000 g/mol, or from 2000 to 10000 g/mol, or from 3000 to 8000 g/mol, or from 3500 to 5500 g/mol, or in another embodiment, a theoretical molecular weight of at least 1000 (g/mol), more preferably greater than 1200 g/mol, more preferably greater than 1500 g/mol, more preferably greater than 1700 g/mol, and/or less than 15000 g/mol, more preferably less than 14000 g/mol, more preferably less than 13000 g/mol, more preferably less than 12000 g/mol, or from 1500 to 12000 g/mol, or from 2000 to 12000 g/mol, or from 2500 to 12000 g/mol, or from 2500 to 11000 g/mol, or from 2500 to 10000 g/mol.

If used, the oligomer component preferably comprises, consists of, or consists essentially of one or more reactive oligomers possessing at least one reactive, or functional group. It is preferred that such reactive or functional group is a polymerizable group. Although some unreactive oligomers may be contemplated for use in the current invention, a large percentage of reactive oligomers is preferred. In an embodiment, the oligomer component consists of or consists essentially of reactive oligomers.

In an embodiment, the reactive oligomer component according to the invention comprises, consists essentially of, or consists of reactive oligomers having at least one polymerizable group. In a preferred embodiment, the reactive oligomer component consists of reactive oligomers having at least one polymerizable group. The polymerizable groups may be of any known type. In an embodiment, however, the polymerizable group may comprise, consist essentially of, or consist of acrylate or methacrylate groups, or any combination thereof. The reactive oligomers are preferably ethylenically unsaturated polymerizable compounds that contain one or more than one reactive olefinic double bond.

The polymerizable groups may occur at any feasible point along the length of the reactive oligomer, including as polymerizable backbone groups or polymerizable endgroups. Polymerizable backbone groups are present along, or branch from, a linear chain along the length of the oligomer, whereas polymerizable endgroups are polymerizable groups that are present at a terminus of the oligomer. The polymerizable groups may occur in isolation from, or directly or indirectly adjacent to other polymerizable groups, such as in a branched or forked pattern at a terminus (synonymously referred to herein as a "termination point") of an oligomer, for example. In a preferred embodiment, the polymerizable groups comprise, consist essentially of, or consist of polymerizable endgroups.

Reactive oligomers according to the present invention may be of any known type consistent with the definitions specified elsewhere herein. Multi-layered optical device compositions typically utilize reactive urethane oligomers due to the desirable properties they can impart into the associated articles cured therefrom. In an embodiment, the oligomer component comprises, consists of, or consists essentially of one or more urethane oligomers, preferably reactive urethane oligomers. A reactive urethane oligomer includes at least one urethane group, or moiety, and preferably comprises at least a backbone, a polymerizable group, and a urethane group which links the backbone to the polymerizable group. According to the first aspect, the reactive urethane oligomer comprises the reaction product of a polyol, a polyisocyanate, and an isocyanate-reactive (meth)acrylate.

Examples of suitable polyol compounds, which are preferably used to form the backbone of the oligomer, include polyether polyols, polyester polyols, polycarbonate polyols, polycaprolactone polyols, acrylic polyols, and other polyols. These polyols may be used either individually or in combinations of two or more. In a preferred embodiment, the backbone of the urethane oligomer comprises the reaction product of a polyether polyol. In an embodiment, the backbone comprises the reaction product of a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable. As used herein, a polyol is intended to include organic compounds containing greater than or equal to two hydroxyl functional groups per molecule.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In a preferred embodiment, the particular block refers to a polyether block, which is derived from one or more of the polyols, preferably polyether polyols, described elsewhere herein. In an embodiment, the block to which a mono-, di-, and/or tri-block copolymer refers is a polyether block which is derived from one or more of the polyols described elsewhere herein. In an embodiment, a monoblock copolymer may be described as a copolymer having only an average of around 1, or from about 0.9 to less than 1.5 units of a particular block, such as a polyether block. In an embodiment, a diblock copolymer may be described as a copolymer having an average of around 2, or from at least 1.5 to less than 2.5 units of a particular block, such as a polyether block. In an embodiment, a triblock copolymer may be described as a copolymer having an average of around 3, or from at least 2.5 to less than 3.5 units of a particular block, such as a polyether block. The number of polyether units in a given oligomer may be determined by the number of polyether polyol molecules utilized in the synthesis of a single oligomer.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, propylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available such as, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, and PTGL2000 (manufactured by Hodogaya Chemical Co., Ltd.), PEG400, PEG600, PEG1000, PEG1500, PEG2000, PEG4000, and PEG6000 (manufactured by Daiichi Kogyo Seiyaku Co., Ltd.), P710R, P1010, P2010, and the 1044 Pluracol® P Series (by BASF), the Acrol® and Acclaim® series including PPG725, PPG1000, PPG2000, PPG3000, PPG4000, and PPG8000, as well as the Multranol® series including PO/EO polyether diols having a Mw of 2800 or 40000 (by Covestro). Additionally, AGC Chemicals provides diols under the trade name Preminol®, such as Preminol S 4013F (Mw 12,000), Preminol 4318F (Mw 18,000), and Preminol 5001F (Mw 4,000).

Polyester diols obtained by reacting a polyhydric alcohol and a polybasic acid are given as examples of the polyester polyols. Examples of the polyhydric alcohol include ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like. Examples of the polybasic acid include phthalic acid, dimer fatty acid, isophthalic acid, terephthalic acid, maleic acid, fumaric acid, adipic acid, sebacic acid, cyclohexanedicarboxylic acid, hexahydrophthalic acid/anhydride, and the like. Preferably, the polybasic acid is selected so that the resulting polyester polyol is unsaturated.

These polyester polyol compounds are commercially available under the trade names such as MPD/IPA500, MPD/IPA1000, MPD/IPA2000, MPD/TPA500, MPD/TPA1000, MPD/TPA2000, Kurapol® A-1010, A-2010, PNA-2000, PNOA-1010, and PNOA-2010 (manufactured by Kuraray Co., Ltd.).

Triols, such as polyester or polyether triols are also known. Especially preferred are oligo-triols, which have the general formula: A(-----OH)$_3$; wherein A is a chemical organic structure, such as an aliphatic, cycloaliphatic, aromatic, or heterocyclic structure, "-----" is an oligomeric chain, such as a polyether chain, a polyester chain, a polyhydrocarbon chain, or a polysiloxane chain, to name a few, and "OH" is a terminal hydroxy group. In an embodiment, the triol comprises, consists of, or consists essentially of a polyether triol, a PO homopolymer, a PE homopolymer, PO-EO block copolymers, random copolymer or hybrid block-random copolymers. In practice, polyether triols may be based on glycerol or trimethylolpropane, PO, EO or PO and EO copolymer with EO on terminal block or internal block and a $MW_{theo}$ from approximately 500 to 15,000 g/mol. Another type of polyether triol are copolymers based on glycerol or trimethylolpropane, such as THF-PO, THF-EO, THF-PO-EO or THF-EO-PO and having a molecular weight between about 500 and 15,000. In a preferred embodiment, the triol is derived from bio-based or natural reactants, such as certain vegetable oils and fats.

Commercial examples of suitable triols include the relevant propylene oxide-based polyether triols available from Carpenter under the Carpol® GP-designation, such as GP-1000, GP-1500, GP-1500-60, GP-3000, GP-4000, GP-5017, GP-5017-60, GP-5171, GP-6015, GP-6015-60, GP-6037-60, and GP-700. Further triols are commercially available from Covestro under the Arcol® brand, such as Arcol LHT-240 (Molecular weight "Mw" stated by the manufacturer of approximately 700), Arcol LHT-112 (Mw 1500), Arcol LHT LG-56 (Mw 3000), and Arcol LHT-42 (Mw 4200), the Multranol® tradename such as Multranol 9199 (Mw 4525), Multranol 3900 (Mw 4800), Multranol 3901 (Mw 6000), and Multranol 9139 (Mw 6000), as well as those under the trade name Acclaim© such as Acclaim 703 (Mw 700), Acclaim 3300N (Mw 3000), Acclaim 6300 (Mw 6000), and Acclaim 6320 (Mw 6000). Additionally, AGC Chemicals provides triols under the trade name Preminol®, such as Preminol S 3011(Mw 10,000), Preminol 7001K (Mw 7,000), and Preminol 7012 (Mw 10,000).

The theoretical molecular weight derived from the hydroxyl number of these polyols is usually from about 50 to about 15,000, and preferably from about 500 and 12,000, or from about 1,000 to about 8,000.

The reaction product of a (poly)isocyanate compound, preferably a diisocyanate compound, may be utilized to create the urethane group or moiety in the reactive urethane oligomer according to the first aspect of the invention. As used herein, an isocyanate compound is defined as any organic compound which possesses at least one isocyanate group per molecule. Examples of suitable isocyanates include diisocyanates such as 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, 2,4- and/or 4,4'-methylenedicyclohexyl diisocyanate, methylenediphenyl diisocyanate, tetramethylxylene diisocyanate, 1,5-pentane diisocyanate, bis(2-isocyanatoethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like.

These diisocyanate compounds may be used either individually or in combinations of two or more. In various embodiments, the diisocyanates include isophorone diisocyanate, 2,2,4-trimethylhexamethylene diisocyanate, 2,4,4 trimethylhexamethylene diisocyanate and hexamethylene diisocyanate, 2,4-tolylene diisocyanate, and/or 2,6-tolylene diisocyanate (a mixture of the two aforementioned diisocyanates is provided commercially under the common name "TDI") Particularly preferred diisocyanates include trimethylhexamethylene diisocyanate (TMDI) compounds and isophorone diisocyanate (IPDI) compounds.

As used herein, "polyisocyanate" indicates that the isocyanate compound has two or more isocyanate moieties per molecule. In an embodiment, the oligomer component comprises, consists essentially of, or consists of a urethane oligomer which is the reaction product of one or more polyisocyanates. In addition to the diisocyanates specified above, polyisocyanates having three isocyanate groups per molecule, i.e. triisocyanates, may also be used. Known triisocyanates include biurets made from hexamethylene diisocyanate (HDI) or HDI trimers, which are commercially available from Covestro under the Desmodur® tradename and including, without limitation, Desmodur N 3200, Desmodur N 3300, Desmodur N 3390, Desmodur N 3600, Desmodur N 3800, Desmodur N 3900, Desmodur N XP 2580, Desmodur XP 2599, Desmodur XP 2675, Desmodur XP 2731, Desmodur XP 2714 and Desmodur XP 2803.

Further commercially-available triisocyanates include the Vestanat® T (IPDI-trimer) and HT (HDI-trimer) lines of polyisocyanate crosslinkers for 2k systems, available from Evonik.

In an embodiment, the reactive urethane oligomer also comprises the reaction product of an isocyanate-reactive (meth)acrylate. Any suitable (meth)acrylates can be used, including monomers and oligomers, although (meth)acrylate monomers are preferred. Such isocyanate-reactive (meth)acrylates preferably include hydroxyl group-containing (meth)acrylate compounds, as such compounds are known to be reactive with isocyanates, including the polyisocyanates. Examples of the hydroxyl group-containing (meth)acrylates include (meth)acrylates derived from (meth) acrylic acid and epoxy and (meth)acrylates comprising alkylene oxides, more in particular, 2-hydroxy ethyl (meth) acrylate, 2-hydroxypropyl(meth)acrylate, 2-hydroxy-3-phenoxypropyl(meth)acrylate, and hydroxyethylcaprolactoneacrylate, ethoxylated trimethylolpropane diacrylate, glycerol di(meth)acrylate, and glycerol acrylate methacrylate (i.e., 3-(Acryloyloxy)-2-hydroxypropyl methacrylate).

In an embodiment, the urethane oligomer also comprises the reaction product of a non-functional endcapper. Such a compound, when reacted into the oligomer via the (poly) isocyanate compound and/or the isocyanate-reactive (meth) acrylate, forms a distal termination point along at least one arm or chain of a urethane oligomer along which no polymerizable group otherwise occurs. The non-functional endcapper may include non-UV curable compounds having an active hydrogen group, such as mercapto group-containing (—SH) compounds, amino group-containing (—NH$_2$) compounds, and hydroxyl group-containing (—OH) compounds.

In a preferred embodiment, the urethane oligomer comprises the reaction product of a monohydric alcohol not possessing a (meth)acrylic moiety. Such compounds are preferably reactive with the aforementioned (poly)isocyanates. The monohydric alcohol not possessing a (meth) acrylic moiety may endcap the oligomer with a hydroxyl group, making that arm or chain non-polymerizable.

In an embodiment, the monohydric alcohol compound not possessing a (meth)acrylic moiety is an aliphatic compound, such as a $C_1$-$C_{15}$, or $C_2$-$C_{12}$, or $C_4$-$C_{10}$ linear or branched monohydric alcohol not possessing a (meth)acrylic moiety.

Any suitable monohydric alcohol not possessing a (meth) acrylic moiety may be used, but in a preferred embodiment, the monohydric alcohol not possessing a (meth)acrylic moiety comprises, consists of, or consists essentially of methanol, ethanol, isopropyl alcohol, butanol, pentanol, 2-ethyl hexanol, cetyl alcohol, allyl alcohol, geraniol, propargyl alcohol, inositol, menthol, or any combination thereof.

In the reaction of the components used to create a urethane oligomer, one or more urethanization catalysts are also preferably used. Such catalysts include, by way of an example, copper naphthenate, cobalt naphthenate, zinc naphthenate, di-n-butyl tin dilaurate, triethylamine, and triethylenediamine-2-methyltriethyleneamine. The catalyst may be used in any suitable amount, or for example from about 0.01 to about 1 wt. % of the total amount of the reactant. The reaction may be carried out at any suitable temperature, such as between 10 to 150° C., or from about 10 to about 90° C., or from about 30 to about 80° C.

In an embodiment, the urethane oligomer comprises difunctional reactive urethane oligomers. As used herein, difunctional means possession of an average of between 1.5 to 2.5 polymerizable groups per molecule, as determined by a nuclear magnetic resonance spectroscopy (NMR) method. In other embodiments, however, the oligomer component comprises, consists essentially of, or consists of trifunctional reactive urethane oligomers, or oligomers possessing an average of greater than 2.5 to 3.5 polymerizable groups per molecule. In another embodiment, the oligomer component comprises tetrafunctional oligomers, or those having an average of greater than 3.5 to 4.5 polymerizable groups per molecule. In a preferred embodiment, the oligomer component comprises, consists essentially of, or consists of one or more reactive urethane oligomers having an average (meth) acrylate functionality of between 1.5 and 4.2, or from 1.8 to 3.8, or from 1.8 to 3.2, or from 1.8 to 2.8. In an embodiment, the average (meth)acrylate functionality of the oligomer component is between 1.5 and 4.2, or from 1.8 to 3.8, or from 1.8 to 3.2, or from 1.8 to 2.8.

One or more of the aforementioned reactive urethane oligomers can be employed in compositions according to the present invention in any suitable amount and may be chosen singly or in combination of one or more of the types enumerated herein. In an embodiment, therefore, the oligomer component or reactive urethane oligomer is present in an amount, relative to the entire weight of the composition, in an amount less than 65 wt. %., or from 10-65 wt. %, or from 10-55 wt. %, or from 10-50 wt. %, or from 10-40 wt. %; or from 15-65 wt. %, or from 15-55 wt. %, or from 15-50 wt. %, or from 15-40 wt. %; or from 20-65 wt. %, or from 20-55 wt. %, or from 20-50 wt. %, or from 20-40 wt. %; or from 25-65 wt. %, or from 25-55 wt. %, or from 25-50 wt. %, or from 25-40 wt. %; or from 30-65 wt. %, or from 30-55 wt. %, or from 30-50 wt. %, or from 30-40 wt. %.

In an embodiment, at least one of the monomer component and the oligomer component is present in the composition. In another embodiment, both the monomer component and the oligomer component are present. In another embodiment, however, neither the monomer component nor the oligomer component are present. In such case, it is preferable that the characteristics and functionality desirable in polymeric layer(s) of multi-layered optical devices which are typically imparted by monomers and oligomers as described herein are otherwise satisfied primarily via the self-healing component as described further below.

Self-Healing Component

According to the first aspect, the composition includes a self-healing component; that is, a collection of one or more than one individual constituents which possess a self-healing moiety. The self-healing component may comprise, consist of, or consist essentially of, monomers and/or oligomers possessing at least one self-healing moiety or group. As used herein, "moiety" and "group" are used interchangeably. A self-healing moiety is a collection of atoms which together facilitate reversible interactions or covalent reactions with other self-healing moieties in a given composition without the express requirement of an external stimulus, such as the application of radiation energy including UV or heat. Of course, it will be understood that it remains possible that such reversible interactions or covalent reactions can be effectuated or even accelerated via external stimuli. Via this process, which is also known as self-assembly, self-healing moieties contribute to enabling a polymeric material to self-heal and/or exhibit improved stress-relaxation characteristics. It is not necessary for a cured product of a composition into which the self-healing moieties of the present invention are included to exhibit a specific minimum degree of self-healing and/or stress relaxation, as it will be appreciated that the degree of self-healing and/or stress-relaxation will vary with the specific associated formulation and the demands and environmental conditions of the end-use application.

In a preferred embodiment, however, in order to produce a desirable amount of stress-relaxation or self-healing at the temperatures and timescales required of the end use application, a sufficient quantity of self-healing material should be present in the composition from which the polymeric layer(s) of the multi-layered optical device is derived or cured. Inventors have found that self-healing and/or stress-relaxation may be optimized when the composition possesses either a sufficient quantity of the self-healing component and/or when the composition possesses greater than a suitable minimum quantity of self-healing moieties.

According to a first aspect of the invention, therefore, the self-healing component is present, relative to the weight of the entire composition, in an amount greater than 30 wt. %, and/or the composition possesses greater than 0.015 equivalents of self-healing moieties per 100 g of the composition. As used herein, "equivalents" of self-healing moieties for a given composition are determined by summing the amount of moles of self-healing moieties in the self-healing component (Z), in accordance with the following expression:

$$Z = \frac{N \times Wt}{MM}$$

wherein Wt=the amount by weight of the respective component Z relative to 100 g of the total associated composition; N=the number of self-healing moieties present in one molecule of component Z; and MM is the theoretical molecular mass of component Z.

If the complete recipe of a composition is not known, the equivalents of self-healing moieties may be determined analytically via any suitable method as will be appreciated by the skilled artisan to which this invention applies, such as via size exclusion chromatography (SEC) or nuclear magnetic resonance (NNMR) methods.

In other embodiments, depending on the nature and type of the self-healing moieties employed, the composition contains from 0.015 to 0.5 equivalents, or from 0.015 to 0.2, or from 0.015 to 0.15, or from 0.015 to 0.1, or from 0.015 to 0.08, or from 0.015 to 0.05, or from 0.015 to 0.045; or from 0.02 to 0.2, or from 0.02 to 0.15, or from 0.02 to 0.1, or from 0.02 to 0.08, or from 0.02 to 0.05; or from 0.022 to 0.15, or from 0.022 to 0.1, or from 0.022 to 0.08, or from 0.022 to 0.05, or from 0.022 to 0.045; or from 0.025 to 0.20; or from 0.037 to 0.15, or from 0.037 to 0.1, or from 0.037 to 0.08, or from 0.037 to 0.05 equivalents. For the avoidance of doubt, unless otherwise specified, all "equivalents" values expressed herein relate to equivalents of the desired moiety (UPy, self-healing, (meth)acrylate, etc.) per 100 g of the entire composition.

Various types of self-healing moieties are known. One class of self-healing moieties includes hydrogen bonding groups. Hydrogen bonding groups are those which form hydrogen bonds, either during polymerization or while the composition remains in an uncured, liquid state. In an embodiment, the hydrogen bonding groups are multi-hydrogen bonding groups. As used herein, a "multi-hydrogen bonding group" is one which is configured to provide at least three hydrogen bonds in a dimer formed from two molecules containing the same or a different self-healing moiety. A preferred type of multi-hydrogen bonding group includes a 2-ureido-4-pyrimidinone (UPy) group. UPy groups, or moieties (such terms are used interchangeably herein), are desirable because they are known to be self-complementary and produce strong multi-hydrogen bonding effects, such as on the order of approximately 14 kcal/mol, as calculated based on direct addition of hydrogen bonding energy without considering secondary interaction effect. This is far less than the bond dissociation energy between a single covalent bond (such as a carbon-carbon bond, which is on the order of approximately 100 kcal/mol), but it exceeds that of other hydrogen bonding groups, such as N—H---:O and N—H---:N, among others (which are estimated at between 2-8 kcal/mol). As such, UPy moieties can produce a so-called "super" hydrogen bonding effect. A non-limiting example of a UPy group is 6-methyl-2-ureido-4-pyrimidinone, according to the following chemical structure:

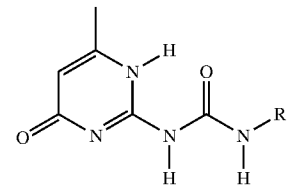

UPy groups may be formed as a reaction product of a multi-hydrogen bonding group precursor. A non-limiting example of such a multi-hydrogen bonding group precursor is 2-amino-4-hydroxy-6-methyl-pyrimidine, which possesses the following chemical structure:

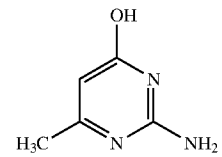

Upy groups may be formed as a reaction product of other multi-hydrogen bonding group precursors, such as 2-amino-4-hydroxy-pyrimidine, 2-amino-4-hydroxy-6-ethyl-pyrimidine, 2-amino-4-hydroxy-6-propyl-pyrimidine, 2-amino-4-hydroxy-6-butyl-pyrimidine, 2-amino-4-hydroxy-6-hexyl-pyrimidine, 2-amino-4-hydroxy-6-octyl-pyrimidine and 2-amino-4-hydroxy-6-(2-hydroxylethyl)-pyrimidine.

In an embodiment, the self-healing moieties comprise, consist of, or consist essentially of multi-hydrogen bonding groups. In an embodiment, the self-healing moieties comprise, consist of, or consist essentially of UPy groups.

In various embodiments of the first aspect, the self-healing component will possess, at minimum, a first molecule possessing a first self-healing moiety, and a second molecule possessing a second self-healing moiety, wherein the first self-healing moiety of the first molecule is configured to bond to the second self-healing moiety of the second molecule. In an embodiment, the bond dissociation energy formed between the first self-healing moiety and the second self-healing moiety is between 9 kcal/mol to 100 kcal/mol, or from 9 kcal/mol to 80 kcal/mol, or from 10 kcal/mol to 50 kcal/mol, or from 12 kcal/mol to 50 kcal/mol, or from 12 kcal/mol to 90 kcal/mol, or from 9 kcal/mol to 30 kcal/mol, or from 9 kcal/mol to 20 kcal/mol. The bond dissociation energy may be determined by various suitable methods, a non-limiting example of which can be found via direct addition summary of all bonds of self-healing moieties in accordance with Table 1 of The Scientific World JOURNAL (2004) 4, 1074-1082; and Nature 2002, volume 3, 836-847.

The first self-healing moiety and the second self-healing moiety may be different, although in a preferred embodiment, they are the same. In an embodiment, the first and second self-healing moieties are the same and are configured to dimerize. A dimerization is an addition reaction in which two molecules of the same compound react with each other to yield an adduct. Upon forming a dimer, the two molecules will align to preferably form multiple hydrogen bonds. In a preferred embodiment, the dimer will possess at least 3, or at least 4, or from 3 to 4 hydrogen bonds. In an embodiment, the dimer formed will also comprise a first linear chain linked to each of the hydrogen bonds on a side of the first self-healing moiety, and a second linear chain linked to each of the 3 or 4 hydrogen bonds on a side of the second self-healing moiety, wherein each of the first linear chain and the second linear chain comprises less than 7 covalent bonds.

The full molecular structures into which the self-healing moieties are incorporated can be of any suitable type. In an embodiment, however, the self-healing moieties are incorporated into a monomer or oligomer, including the types listed elsewhere herein, supra. In a preferred embodiment, the self-healing moieties are incorporated into reactive urethane oligomers. Such oligomers, which are specifically also described elsewhere herein, supra, may be utilized and constructed in similar fashion previously described, with the further addition that a self-healing moiety is added thereto via known reaction mechanisms so as to yield structures which are incorporated in the self-healing component. In embodiments wherein UPy groups are built into urethane oligomers as described elsewhere herein, the diisocyanate(s) used may comprise, consist of, or consist essentially of trimethylhexamethylene diisocyanate (TMDI) compounds and/or isophorone diisocyanate (IPDI) compounds. This is because Inventors have found that, depending upon stoichiometry and the other reactants used, the reaction of precursors to UPy groups and some other diisocyanate compounds (such as hexamethylene diisocyanate) may yield a solid product at room temperature. This has a tendency to make overall oligomer synthesis more costly and/or difficult, particularly on a commercial scale.

Inventors have surprisingly found that many self-healing oligomers described herein, and in particular those containing at least 3 urethane linkages tend to yield oligomers which have lower viscosity values and/or are more readily processable in, among other areas, an optical fiber coating application, thereby enabling the use of an increased loading of self-healing content in the associated coating composition. The addition of large quantities of self-healing components is important to facilitating the creation of a formulation which is suitable for use in producing self-healing and/or stress-relaxing cured products that are capable of ready processability in, i.a., coated optical fiber production.

In an embodiment, the self-healing component comprises, consists of, or consists essentially of one or more molecules according to the following structure (VI):

$$[A(G)_n\text{-}D_m]\text{-}[A(G)_{n-1}\text{-}D_m]_k\text{-}Z \qquad (VI);$$

wherein

A is carbon or nitrogen;

wherein when A is an sp3 carbon, n=3, and when A is an sp2 carbon or a nitrogen, n=2;

m is an integer from 0 to 500;

k is a number from 0-20;

D is, for each occurrence of m, a divalent spacer independently chosen from —O—; —C(O)—; -Aryl-; —C≡C—; —N═N—; —S—; —S(O)—; —S(O)(O)—; —(CT$_2$)-, —N(T)—; —Si(T)$_2$(CH$_2$)—; —(Si(T)$_2$O)—; —C(T)═C(T)—; —C(T)═N—; —C(T)═; —N═; or combinations thereof, wherein for each instance in D of a single bond, a single bond is connected thereto, and for each instance in D of a double bond, a double bond is connected thereto;

wherein each T is selected for each occurrence from single valent units including hydrogen, F, Cl, Br, I, C$_1$-C$_8$ alkyl, C$_1$-C$_8$ alkoxy, substituted amino, or substituted aryl;

wherein each T can also be selected from divalent D$_m$ and connects to another divalent T that's also selected from D$_m$ and form a ring structure; and and i is an integer from 1-40;

wherein each group for each unit of m, n, and k can be the same or different;

Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylatef, hydrogen, F, Cl, Br, I, or maleimido group; and G is, for each occurrence of n, independently selected from hydrogen, —D$_m$-Z, or a self-healing moiety according to the following structure (VI-b):

$$(Z\text{-}D_m)_j X\text{-}D_m\text{-} \qquad (VI\text{-}b);$$

wherein

X is a multi-hydrogen bonding group, a disulfide group, or a urea group;

j=1 when X is divalent, and j=0 when X is monovalent;

wherein for at least one occurrence of n, G is a self-healing moiety according to structure (VI-b).

In an embodiment, X comprises, consists of, or consists essentially of disulfide groups and/or urea groups. In a preferred embodiment. X is a 2-ureido-4-pyrimidinone group (UPy), and j=0. The UPy group may be the reaction of any suitable compound, but in an embodiment, it comprises the reaction product of 2-amino-4-hydroxy-6-methyl-pyrimidine. In an embodiment, X comprises, consists of, or consists essentially of the following structure (VI-c):

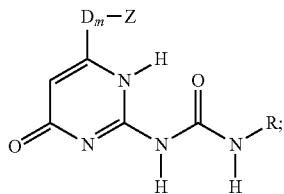

(VI-c)

wherein D, m, and Z are as defined above with respect to structure (VI), and R represents the remaining portion of structure (VI).

In certain embodiments, D comprises a urethane group, wherein the urethane group is the reaction product of a diisocyanate compound. In certain embodiments, D also or alternatively comprises a polyol component. The polyol component may be of any suitable type, including but not limited to polyether polyols, polyester polyols, polycarbonate polyols, polycaprolactone polyols, acrylic polyols, other polyols, and/or combinations thereof. Suitable diisocyanate compounds and polyols are described elsewhere herein, supra.

In certain embodiments, Z comprises a (meth)acrylate group. Such a functionality would render the molecules according to structure (VI) polymerizable in a manner consistent with many current conventional coatings, such as those for use in optical fibers and/or other polymeric layers in multi-layered optical devices.

In an embodiment, the self-healing component comprises, consists of, or consists essentially of molecules possessing a theoretical molecular weight ($MW_{theo}$) of between 500 and 100,000 g/mol. In a preferred embodiment, the self-healing component comprises, consists of, or consists essentially of molecules according to structure (VI) which also possess a theoretical molecular weight ($MW_{theo}$) (in g/mol) between 500 and 8000; or between 500 and 5000; or between 500 and 4000; or between 500 and 3000; or between 500 and 2000; or between 500 and 1500; or between 500 and 1000; or between 500 and 900; or between 500 and 700; or between 700 and 4000; or between 700 and 3000; or between 700 and 2000; or between 700 and 1500; or between 700 and 1000; or between 900 and 4000; or between 900 and 3000; or between 900 and 2000; or between 900 and 1500; or between 1000 and 4000; or between 1000 and 3000; or between 1000 and 2000; or between 1000 and 1500.

Depending on application need, it may be important to tune the self-healing component to maximize effectiveness in promoting self-healing properties and/or stress-relaxation behavior at specific temperatures. For a composition to impart self-healing properties and/or stress-relaxation behavior at room temperature most effectively, for example, it may be preferable to tune the composition such that the glass transition temperature (Tg) of the self-healing component is lower than room temperature. In fact, it is preferred, although not necessarily required, that the self-healing component comprises, consists of, or consists essentially of molecules which possess a Tg value that is below the temperature at which self-healing and/or stress relaxation capabilities are to be desired. In this way, any oligomers having self-healing moieties, for example, will not have crystallized (or have entered a glassy state for amorphous materials) at the operating temperature, thereby maximizing the ability for the self-healing moieties to self-assemble, dimerize, bond together, or otherwise interact in the fashion necessary to effectuate self-healing and/or stress-relaxation.

In an embodiment, therefore, the self-healing component and/or the molecule(s) according to structure (VI) above possess a glass transition temperature (Tg) that is less than 150° C., or less than 25° C., or less than 0° C., or less than −10° C., or less than −20° C., or less than −30° C., or from −30 to 20° C., or from −25 to 20° C., or from −20 to 10° C. All else being equal, lower glass transition temperatures tend to be preferred, as theoretically they would facilitate self-healing and/or stress-relaxation capabilities at a broader range of operating temperatures.

Regardless of the nature of the self-healing moiety or the overall structure with which it is associated, the self-healing component optionally comprises, consists of, or consists essentially of molecules possessing polymerizable moieties as well. If such polymerizable moieties are present, the molecules in the self-healing component therefore can undertake polymerization and/or cross-linking reactions with other molecules in the self-healing component, as well as with those in the optional monomer and/or oligomer components. In this way, the self-healing component will enable bonding both for purposes of building up a "permanent" set of crosslinked polymer chains to impart the physical properties required of the polymeric layer of multi-layered optical devices, such that in an optical fiber coating, as well as the "reversible" interactions or covalent bonds which facilitate its self-healing and/or stress-relaxation. The polymerizable moieties may comprise radiation curable, thermally curable, or both radiation curable and thermally curable moieties, such as, without limitation acryloyloxy, methacryloyloxy, hydroxy, amino, vinyl, alkynyl, azido, aziridino, silyl, siloxy, silylhydride, thio, isocyanato, protected isocyanato, epoxy, aziridino, carboxylate, hydrogen, F, Cl, Br, I, or maleimido groups.

Preferably the polymerizable moieties of the self-healing component comprise radiation curable moieties, such as acrylate or methacrylate groups.

Inventors have also discovered that the effectiveness and usability of self-healing coatings in various applications, including for coating an optical fiber, may be increased if the amount of polymerizable groups in the self-healing component are maintained to within certain values. In an embodiment, therefore, the self-healing component possesses from 0.015 to 0.1 equivalents of polymerizable moieties and/or (meth)acrylate groups per 100 g of the composition, or from 0.03 to 0.1 equivalents, or from 0.037 to 0.1 equivalents, or from 0.03 to 0.08 equivalents, or from 0.03 to 0.05 equivalents, or from 0.037 to 0.08 equivalents, or from 0.037 to 0.05 equivalents.

In a broader context, whether such polymerizable moieties are all included in the self-healing component or not, inventors have discovered that is can also be helpful to control the number of polymerizable moieties in the entire composition. Therefore, in an embodiment, the composition possesses from 0.1 to 0.4 equivalents of polymerizable moieties and/or (meth)acrylate groups per 100 g of the composition, or from 0.1 to 0.3 equivalents, or from 0.1 to 0.25 equivalents, or from 0.15 to 0.4 equivalents, or from 0.15 to 0.3 equivalents, or from 0.15 to 0.25 equivalents, or from 0.15 to 0.2 equivalents.

Additionally, inventors have discovered that it may also be helpful to tune the amount of self-healing moieties and polymerizable moieties relative to each other. It is believed, without wishing to be bound by any theory, that an excessive number of polymerizable moieties relative to self-healing moieties may yield a highly crosslinked cured product which does not facilitate sufficient internal re-orientation of the relative paucity of self-healing groups to self-assemble or reach each other to impart healing. Conversely, if there are an insufficient number of polymerizable groups, the composition will not adequately cure (or not cure fast enough), thereby either rendering such composition unsuitable for processing, and/or increasing the likelihood that the cured coating created therefrom will possess inadequate mechanical performance characteristics.

Therefore, in an embodiment the composition possesses a ratio of equivalents of polymerizable groups to equivalents of self-healing groups, preferably comprising, consisting of, or consisting essentially of UPy groups, in the composition of less than 14, or less than 10, or less than 8, or less than 6, or less than 5, or from 1 to 14, or from 1 to 10, or from 1 to 8, or from 1 to 6, or from 1 to 5, or from 3 to 10, or from 3 to 8, or from 3 to 5. In a preferred embodiment, the aforementioned ratios are applicable to the scenario in which the polymerizable groups comprise, consist of, or consist essentially of (meth)acrylate groups, and the self-healing moieties comprise, consist of, or consist essentially of UPy groups.

The self-healing component can be present in any suitable amount, but in various embodiments, it is present in an amount, relative to the weight of the entire composition, from greater than 30 wt. % to 100 wt. %, or from greater than 30 to 75 wt. %, or from greater than 30 to 70 wt. %, or from greater than 30 to 60 wt. %; or from 40 wt. % to 80 wt. %, or from 40 wt. to 75 wt. %, or from 40 wt. % to 70 wt. %, or from 40 wt. % to 60 wt. %.

Initiator Component

According to the first aspect, the composition includes an initiator component; that is, a collection of one or more than one individual initiators having one or more than one specified structure or type. An initiator is a compound that chemically changes due to the action of some external stimulus, such as heat or light, to produce at least one of a radical, an acid, or a base. Initiators can be used to facilitate polymerization reactions by several mechanisms, including free-radical polymerization and cationic polymerization. In a preferred embodiment, the initiator component comprises, consists of, or consists essentially of initiators which facilitate free-radical polymerization; i.e. it comprises, consists of, or consists essentially of free-radical initiators.

In an embodiment, the composition comprises, consists of, or consists essentially of one or more photoinitiators. A photoinitiator is a compound that chemically changes due to the action of light or the synergy between the action of light and the electronic excitation of a sensitizing dye, preferably to facilitate a polymerization reaction in the composition with which it is associated. Well-known types of photoinitiators include cationic photoinitiators and free-radical photoinitiators. According to an embodiment of the present invention, the photoinitiator comprises, consists of, or consists essentially of free-radical photoinitiators.

In an embodiment, the photoinitiator component includes, consists of, or consists essentially of one or more acylphosphine oxide photoinitiators. Acylphosphine oxide photoinitiators are known, and are disclosed in, for example, U.S. Pat. Nos. 4,324,744, 4,737,593, 5,942,290, 5,534,559, 6,020,529, 6,486,228, and 6,486,226. Preferred types of acylphosphine oxide photoinitiators for use in the photoinitiator component include bisacylphosphine oxides (BAPO) or monoacylphosphine oxides (MAPO). More specifically, examples include 2,4,6-trimethylbenzoylethoxyphenylphosphine oxide (CAS #84434-11-7) or 2,4,6-trimethylbenzoyldiphenylphosphine oxide (CAS #127090-72-6).

The photoinitiator component may also optionally comprise, consist of, or consist essentially of α-hydroxy ketone photoinitiators. For instance, suitable α-hydroxy ketone photoinitiators are α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-Hydroxy-1-{4-[4-(2-hydroxy-2-methyl-propionyl)-benzyl]-phenyl}-2-methyl-propan-1-one and 2-hydroxy-2-methyl-1-[(2-hydroxyethoxy)phenyl]propanone.

In another embodiment, the photoinitiator component includes, consists of, or consists essentially of: α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Yet further suitable photoinitiators for use in the photoinitiator component include oxime esters, such as those disclosed in U.S. Pat. No. 6,596,445. Still another class of suitable photoinitiators for use in the photoinitiator component include, for example, phenyl glyoxalates, for example those disclosed in U.S. Pat. No. 6,048,660.

In another embodiment, the photoinitiator component may comprise, consist of, or consist essentially of one or more alkyl-, aryl-, or acyl-substituted compounds not mentioned above herein.

According to another embodiment, the composition may contain a photoinitiator that is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of silicon, germanium, tin, and lead. In an embodiment, the alkyl-, aryl-, or acyl-substituted photoinitiator is an acylgermanium compound. Such photoinitiators are described in, U.S. Pat. No. 9,708,442, assigned to DSM IP Assets B.V., which is hereby incorporated by reference in its entirety. Known specific acylgermanium photoinitiators include benzoyl trimethyl germane (BTG), tetracylgermanium, or bis acyl germanoyl (commercially available as Ivocerin® from Ivoclar Vivadent AG, 9494 Schaan/Liechtenstein).

Photoinitiators according to the present invention may be employed singularly or in combination of one or more as a blend. Suitable photoinitiator blends are for example disclosed in U.S. Pat. No. 6,020,528 and U.S. Pat. app. No. 60/498,848. According to an embodiment, the photoinitiator component includes a photoinitiator blend of, for example, bis(2,4,6-trimethylbenzoyl) phenylphosphine oxide (CAS

162881-26-7) and 2,4,6-trimethylbenzoylethoxyphenylphosphine oxide (CAS #84434-11-7) in ratios by weight of about 1:11, 1:10, 1:9, 1:8 or 1:7.

Another especially suitable photoinitiator blend is a mixture of bis(2,4,6-trimethylbenzoyl)phenylphosphine oxide, 2,4,6-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable photoinitiator blend is a mixture of bis(2,4,6-trimethylbenzoyl)phenylphosphine oxide and 2-hydroxy-2-methyl-1-phenyl-1-propanone in weight ratios of for instance about 1:3, 1:4 or 1:5.

In an embodiment, the composition may include a thermal initiator. In a preferred embodiment, the thermal initiator comprises, consists of, or consists essentially of thermal free-radical polymerization initiators. Examples of thermal free-radical polymerization initiators include, but are not limited to, azo compounds such as, for example, azo isobutyronitrile (AIBN), 1,1'-azobis(cyclohexanenitrile), 1,1'-azobis(2,4,4-trimethylpentane), C—C labile compounds, such as benzopinacole, peroxides, and mixtures thereof.

In an embodiment, the thermal initiator comprises a peroxide. Possibly suitable peroxides include organic and inorganic peroxides. In an embodiment, the thermal initiator is soluble in the composition.

Examples of peroxides include for example, percarbonates (of the formula —OC(O)O—), peroxy esters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

The thermal free-radical polymerization initiator may for example comprise a percarbonate, a perester or a peranhydride. Peranhydrides are for example benzoylperoxide (BPO) and lauroyl peroxide (commercially available as Laurox™). Peresters are for instance t-butyl per benzoate and 2-ethylhexyl perlaurate. Percarbonates are for example di-t-butylpercarbonate and di-2-ethylhexylpercarbonate or monopercarbonates.

One or more of the aforementioned initiators can be employed for use in the initiator component in compositions according to the first aspect of the present invention in any suitable amount and may be chosen singly or in combination of one or more of the types enumerated herein. In a preferred embodiment, the initiator component comprises, consists of, or consists essentially of free-radical photoinitiators. In an embodiment, the initiator component is present in an amount, relative to the entire weight of the composition, from 0.01 wt. % to 10 wt. %, or from about 0.01 wt. % to about 5 wt. %, or from about 0.1 wt. % to about 3 wt. %, or from 0.1 wt. % to about 10 wt. %, or from about 0.1 wt. % to about 5 wt. %, or from about 1 wt. % to about 5 wt. %.

Additives

Compositions according to the present invention optionally include an additive component; that is, a collection of one or more than one individual additives having one or more than one specified structure or type. Additives are also typically added to compositions to achieve certain desirable characteristics such as improved adhesion to the glass layer(s) of the multi-layered optical device, improved shelf life, improved coating oxidative and hydrolytic stability, and the like. There are many different types of desirable additives, and the invention discussed herein is not intended to be limited by these, nevertheless they are included in the envisioned embodiments since they have desirable effects.

Examples additives for use in the additive component include thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, additives such as paraffin or similar wax-like substances can be added; these migrate to the surface on commencement of the polymerization because of their low solubility in the polymer and form a transparent surface layer which prevents the ingress of air. It is likewise possible to apply an oxygen barrier layer.

Further potentially suitable additives include light stabilizers. Light stabilizers include UV-absorbers such as the well-known commercial UV absorbers of the hydroxyphenyl benzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines include, for example the following:

2-(2-Hydroxyphenyl)-2H-benzotriazoles, for example known commercial hydroxyphenyl-2H-benzotriazoles and benzotriazoles, which are disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987; 5,977,219; and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonylethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H- benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-dit-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

Another example class includes 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Yet another example class includes esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Additional additives suitable for use in the additive component include compounds which accelerate photopolymerization, such as so-called photosensitizers, which shift or broaden the spectral sensitivity of the composition into which they are incorporated. Photosensitizers include, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes. Alternatively, non-aromatic carbonyl compounds may be used. An example of a non-aromatic carbonyl is dimethoxy anthracene.

The curing procedure can be assisted in particular by using additives which create or facilitate the creation of pigmented compositions. Such additives include pigments such as titanium dioxide, and also include additives which form free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817. Further suitable substances for this purpose include benzopinacol compounds.

The additive component may include a photo reducible dye, for example xanthene, benzoxanthene, benzothioxanthene, thiazine, pyronine, porphyrin or acridine dyes, and/or a trihalomethyl compound which can be cleaved by radiation. Such additives are described, for example, in U.S. Pat. No. 5,229,253.

Other conventional additives may be used depending on the intended application. Examples include fluorescent whiteners, fillers, pigments, dyes, wetting agents or levelling assistants. Thick and pigmented coatings can also contain glass microbeads or powdered glass fibers, as described in U.S. Pat. No. 5,013,768, for example.

One or more of the aforementioned additives can be employed in compositions according to the present invention in any suitable amount and may be chosen singly or in combination of one or more of the types enumerated herein. In a preferred embodiment, the additive component is present in an amount, relative to the entire weight of the composition, from 0 wt. % to 59.99 wt. %, or from about 0 wt. % to 40 wt. %, or from 0 wt. % to 30 wt. %, or from 0 wt. % to 20 wt. %, or from 0 wt. % to 10 wt. %, or from 0 wt. % to 5 wt. %; or from 0.01 wt. % to 40 wt. %; or from 0.01 wt. % to 30 wt. %, or from 0.01 wt. % to 20 wt. %, or from 0.01 wt. % to 10 wt. %, or from 0.01 wt. % to 5 wt. %, or from 0.1 wt. % to 2 wt. %.

It is desirable that the compositions according to the first aspect of the invention do not contain additives or components which tend to inhibit the polymerization and/or self-assembly reactions. Specifically, it would be desirable to keep the composition substantially free from reagents which tend to stifle free-radical polymerization or hydrogen-bonding. Such components, will be appreciated by the skilled artisan, may include so-called super acids and/or super bases.

The compositions according to the first aspect of the invention may be tuned such that various amounts of the aforementioned components may be included in various amounts relative to each other. In an embodiment, the monomer and/or oligomer component is present from 10 wt. % to 65 wt. %, or from 10 wt. % to 55 wt. %, or from 10 wt. % to 50 wt. %, or from 10 wt. % to 40 wt. %, or from 10 wt. % to 30 wt. %; or from 20 wt. % to 65 wt. %, or from 20 wt. % to 55 wt. %, or from 20 wt. % to 50 wt. %, or from 20 wt. % to 40 wt. %; the self-healing component is present from greater than 30 wt. % to 100 wt. %, or from greater than 30 to 75 wt. %, or from greater than 30 to 70 wt. %, or from greater than 30 to 60 wt. %; or from 40 wt. % to 80 wt. %, or from 40 wt. to 75 wt. %, or from 40 wt. % to 70 wt. %, or from 40 wt. % to 60 wt. %; the initiator is present from 0.01 wt. % to 10 wt. %, or from 0.05 wt. % to 5 wt. %, or from 0.1 wt. % to 3 wt. %; and the additives are present from 0 wt. % to 59.99 wt. %; wherein each of the components adds up to 100 wt. %.

To be suitable for use in typical various coating applications, such as optical fiber coating applications, the composition must possess suitable viscosity values. The viscosity may be tuned according to methods well-known in the art to which this applies as desired by incorporating, inter alia, reactive diluent monomers or oligomers of various types. Furthermore, as explained elsewhere herein, certain self-healing components, such as those possessing 3 or more, or 4 or more urethane linkages, and/or those according to structure (VI), surprisingly may facilitate viscosity and/or solubility characteristics to enable the formulations with which they are associated to be suitable for use in various coating applications, all while still possessing a sufficient number of self-healing moieties to impart desired self-healing properties and/or stress-relaxation behavior into the cured coatings therefrom. In an embodiment, therefore, the composition possesses a viscosity, as measured at a shear rate of 50 $s^{-1}$ and a temperature of 25° C., of less than 40 Pascal Seconds (Pa·s), or less than 30 Pa·s, or less than 15 Pa·s, or less than 10 Pa·s, or less than 1 Pa·s, or from 1 Pa·s to 20 Pa·s, or from 1 Pa·s to 15 Pa·s, or from 1 Pa·s to 10 Pa·s, or from 0.05 to 5 Pa·s, or from 0.05 to 1 Pa·s.

As discussed, compositions according to the present invention may possess self-healing properties and/or stress-relaxation behavior. In various embodiments, it is desirable to formulate a composition exhibiting measurable self-healing properties. It is often infeasible to directly measure the magnitude of the self-healing efficacy of any coating in its pre-cured, liquid state. Therefore, it is preferable to determine the self-healing efficacy of the composition by measuring certain physical properties of cured products created therefrom. Specifically, it is possible to assess the self-healing abilities when subjecting a fixed quantity of uncured composition according to a predefined, fixed set of curing conditions, and then by measuring certain physical properties both after initial cure, and then at a subsequent time after having damaged the cured product in some controlled way and allowing a period of time for the cured product to self-heal.

In an embodiment, the self-healing may be observed visually, such as by a qualitative assessment of the disappearance of cavitations over time. Visual detections of cavitations are described in, i.a, U.S. Pat. No. 7,067,564, assigned to DSM IP Assets B.V., which is hereby incorporated by reference in relevant part.

In various embodiments, the self-healing is observed by curing any of the compositions according to any of the embodiments of this first aspect into a 3 mil film by subjecting said composition to a 1 J/cm² dose of energy from a radiation source emitting a peak spectral output from 360 nm-400 nm, whereupon when at least one cut damage is formed in the film, said film is configured to heal >80% area of cut damage formed therein within a period of not greater than 8 hours, or preferably not greater than 1 hour, or preferably not greater than 5 minutes, or preferably not greater than 1 minute, while the film is maintained at a temperature of 55° C., preferably 25° C., wherein the healing of the film is determined visually via microscope imaging at 40×, or 100× magnification. In other embodiments, the foregoing test may alternatively be constructed by applying and curing the composition having a self-healing component to a fiber or wire to more closely simulate the geometry and loads under which the resulting self-healing coating will operate in a multi-layered optical device, such as a coated optical fiber.

In an embodiment, the composition, when cured into a 3 mil film by subjecting said composition to a 1 J/cm² dose of energy from a radiation source emitting a peak spectral output from 360 nm-400 nm, possesses a pre-cut tensile strength and a post-cut tensile strength, further wherein the post-cut tensile strength is measured within 10 minutes, or within 30 minutes, or within 2 hours, or within 4 hours, or within 8 hours, or within 12 hours after subjecting the film to the cut procedure described above, wherein for a continuous period beginning from a start of the cut procedure and ending at an end of the measurement, the self-healing multi-layered optical device is maintained at a temperature of less than or equal to 25° C.; wherein the post-cut tensile strength is greater than 50%, or greater than 60%, or greater than 85% of the pre-cut tensile strength, or greater than 90%, or greater than 95%.

The aforementioned pre-cut tensile strength and post-cut tensile strength are preferably measured according to ASTM D638, with some modifications to allow for measurement of softer materials when applicable as will be appreciated by the person having ordinary skill in the art to which this invention applies. Specifically, such modifications might include, applying 3 mil thick coatings with talc and cutting them into 0.5 inch width strips before being conditioned at 50+5% relative humidity and 23.0+1.0° C. overnight. The strips may then be loaded onto a mechanical testing machine with a 2 pound load cell, a crosshead speed of 25.4 mm/min, and a gage length of 2.00 inches where they may be extended until break.

A second aspect of the current invention is a self-healing oligomer according to the following structure (VII):

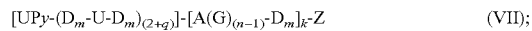

$$[UPy\text{-}(D_m\text{-}U\text{-}D_m)_{(2+q)}]\text{-}[A(G)_{(n-1)}\text{-}D_m]_k\text{-}Z \qquad (VII);$$

wherein

UPy represents a UPy group, wherein the UPy group is a 2-ureido-4-pyrimidinone;

U represents —NHC(O)E- or -EC(O)NH—, wherein E is O, NH, N(alkyl), or S;

q is a number greater than or equal to 0 and less than or equal to 10; preferably q is greater than 0, or 2+q is a number larger than 2 and less than or equal to 4, or larger than 4 and less than or equal to 10.

k is a number from 0 to 20;

A is selected from carbon and nitrogen;

n is 2 or 3, wherein when A is an sp3 carbon, n=3, and when A is an sp2 carbon or a nitrogen, n=2;

m is an integer from 0 to 500;

D is, for each occurrence of m, a divalent spacer independently chosen from —O—, —C(O)—, -Aryl-, —C≡C—, —N=N—, —S—, —S(O)—, —S(O)(O)—, —(CT₂)-, —N(T)-, —Si(T)₂(CH₂)—, —(Si(T)₂O)—, —C(T)=C(T)-, —C(T)=N—, —C(T)=, —N=, or combinations thereof, wherein for each instance in D of a single bond, a single bond is connected thereto, and for each instance in D of a double bond, a double bond is connected thereto;

wherein each T is selected for each occurrence from single valent units including hydrogen, F, Cl, Br, I, $C_1$-$C_8$ alkyl, $C_1$-$C_8$ alkoxy, substituted amino, or substituted aryl;

wherein each T can also be selected from divalent $D_m$ and connects to another divalent T that's also selected from $D_m$ and form a ring structure; and and i is an integer from 1-40;

Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylate, hydrogen, F, Cl, Br, I, or maleimido group; and G is, for each occurrence of n, independently selected from hydrogen, —$D_m$-Z, or a self-healing moiety according to the following structure (VII-b):

$$(Z\text{-}D_m)_jX\text{-}D_m \qquad (VII\text{-}b);$$

wherein

X is a multi-hydrogen bonding group, a disulfide group, or a urea group;

j=1 when X is divalent, and j=0 when X is monovalent; and wherein the oligomer possesses greater than 0.022, or greater than 0.025, or greater than 0.03, or greater than 0.04, or greater than 0.05, or greater than 0.1 equivalents of UPy groups per 100 grams of the oligomer.

The oligomer according to structure (VII) may be used to impart self-healing properties and/or stress-relaxation behavior into a coating or composition into which it is incorporated. It may be used to impart such properties in a variety of end-use applications, such as coating, adhesives, build material for 3D printing applications, or in multi-layer optical devices. Such multi-layer optical devices may include, without limitation, optical films, polarizers, electronic equipment displays, lighting devices, ophthalmic lenses, photochromic lenses, microscopy lenses, laser mirrors, imaging lenses, or optical fibers. In an embodiment, the oligomer according to structure (VII) is used in a composition for forming a polymeric layer in a photochromic lens or an optical fiber. In an embodiment, if used in a composition for forming a polymeric layer of an optical fiber, said composition comprises an optional reactive monomer and/or oligomer component, a photoinitiator component, and a self-healing component comprising, consisting of, or consisting essentially of oligomers according to structure (VII).

As mentioned previously with respect to compositions of the first aspect, according to various embodiments of the second aspect of the invention in which the self-healing oligomer according to structure (VII) is accompanied by an associated composition, such as an optical fiber coating composition, there should be a sufficient quantity of the self-healing component present. In an embodiment, therefore, the self-healing component comprising, consisting of, or consisting essentially of the self-healing oligomer according to structure (VII) is present, relative to the weight of the entire associated composition, in an amount greater than 30 wt. %, or greater than 40 wt. %, or greater than 50 wt. %, or greater than 60 wt. %, or greater than 70 wt. %, or greater than 80 wt. %, or from greater than 30 wt. % to 100 wt. %, or from greater than 30 wt. % to 90 wt. %, or from greater than 30 wt. % to 80 wt. %, or from greater than 30 wt. % to 70 wt. %, or from 40 wt. % to 100 wt. %, or from 40 wt. % to 80 wt. %, or from 40 wt. % to 70 wt. %, or from 50 wt. % to 100 wt. %, or from 50 wt. % to 80 wt. %, or from 50 wt. % to 75 wt. %.

In other embodiments according to the second aspect, the composition with which the self-healing oligomer according to structure (VII) is associated possesses greater than certain minimum quantities of self-healing moieties. As the self-healing oligomer according to structure (VII) possesses UPy groups as self-healing moieties, in an embodiment, the composition possesses greater than 0.015 equivalents of UPy groups per 100 g of the composition, or from 0.015 to 0.2 equivalents, or from 0.015 to 0.1 equivalents, or from 0.015 to 0.08 equivalents, or from 0.015 to 0.05 equivalents, or from 0.015 to 0.045 equivalents; or from 0.02 to 0.2 equivalents, or from 0.02 to 0.1 equivalents, or from 0.02 to 0.08 equivalents, or from 0.02 to 0.05 equivalents; or from 0.025 to 0.20 equivalents; or from 0.037 to 0.2 equivalents, or from 0.037 to 0.1 equivalents, or from 0.037 to 0.08 equivalents, or from 0.037 to 0.05 equivalents.

The quantity of the various components used in a formulation with which the self-healing oligomer according to structure (VII) is associated may be tuned to various amounts to suit the requirements of the specific intended application. However, in an embodiment, the reactive monomer and/or oligomer component is present from 10 wt. % to 65 wt. %, or from 10 wt. % to 55 wt. %, or from 10 wt. % to 50 wt. %, or from 10 wt. % to 40 wt. %, or from 10 wt. % to 30 wt. %; or from 20 wt. % to 65 wt. %, or from 20 wt. % to 55 wt. %, or from 20 wt. % to 50 wt. %, or from 20 wt. % to 40 wt. %; the self-healing component is present from 30 wt. % to 100 wt. %, or from 30 wt. % to 80 wt. %, or from 30 to 75 wt. %, or from 30 wt. % to 70 wt. %, or from 30 to 60 wt. %; or from 40 wt. % to 80 wt. %, or from 40 wt. % to 75 wt. %, or from 40 wt. % to 70 wt. %, or from 40 wt. % to 60 wt. %; the photoinitiator is present from 0.01 wt. % to 5 wt. %, or from 0.1 wt. % to 3 wt. %; and the additives are present from 0 wt. % to 59.99 wt. %; wherein each of the components adds up to 100 wt. %.

Similarly, depending on the requirements of the specific application into which the self-healing oligomer of structure (VII) will be associated, the viscosity of the accompanying composition may vary significantly. However, in an embodiment, such as an embodiment where the self-healing oligomer of structure (VII) is incorporated into, i.a, an optical fiber coating composition, the composition should be configured to possesses an overall viscosity, as measured at a shear rate of 50 s$^{-1}$ and a temperature of 25° C., of less than 40 Pascal Seconds (Pa·s), or less than 30 Pa·s, or less than 15 Pa·s, or less than 10 Pa·s, or less than 1 Pa·s, or from 1 Pa·s to 20 Pa·s, or from 1 Pa·s to 15 Pa·s, or from 1 Pa·s to 10 Pa·s, or from 0.05 to 5 Pa·s, or from 0.05 to 1 Pa·s. If the viscosity is too low, the composition may not adhere appropriately to adjoining layers, such as the glass fiber during an optical fiber coating process; conversely, if the viscosity is too high, it may not be possible to apply the composition to the adjoining layer, such as the glass fiber, quickly enough at the processing speeds demanded by conventional manufacturing operations.

One of the ways in which the viscosity of the composition may be tuned to be suitable is to control the molecular weight of the self-healing oligomer according to structure (VII). Inventors have discovered that by formulating the self-healing oligomer according to structure (VII) with a certain number of linking urethane groups, it is possible maintain both the viscosity and/or solubility of the self-healing oligomer according to structure (VII) to desired levels. In an embodiment, therefore, the self-healing oligomer according to structure (VII) possesses at least three urethane linking groups, or at least four urethane linking groups, or from 3 to 6 urethane linking groups, or from 3 to 5 urethane linking groups, or from 4 to 5 urethane linking groups. If the self-healing oligomer according to structure (VII) is configured to possess from 3 to 4 urethane linking groups, the oligomer ideally possesses a MW$_{theo}$ from 500 to 4500, or from 1000 to 4500 g/mol. If, on the other hand, the self-healing oligomer according to structure (VII) possesses from 4 to 5 urethane linking groups, the oligomer possesses a MW$_{theo}$ from 500 to 8000, or from 1000 to 8000 g/mol.

Regardless of the presence or number of urethane linking groups, in various embodiments, the self-healing oligomer according to structure (VII) possesses a theoretical molecular weight (MW$_{theo}$) (in g/mol) between 500 and 8000; or between 500 and 5000; or between 500 and 4500; or between 500 and 4000; or between 500 and 3000; or between 500 and 2000; or between 500 and 1500; or between 500 and 1000; or between 500 and 900; or between 500 and 700; or between 700 and 4000; or between 700 and 3000; or between 700 and 2000; or between 700 and 1500; or between 700 and 1000; or between 900 and 4000; or between 900 and 3000; or between 900 and 2000; or between 900 and 1500; or between 1000 and 4000; or between 1000 and 3000; or between 1000 and 2000; or between 1000 and 1500. If the molecular weight of the self-healing oligomer according to structure (VII) is too high, it may have the effect of inhibiting the solubility of the self-healing oligomer into the associated composition and/or the content of self-healing moieties will be diluted to the point that the self-healing and/or stress-relaxation efficacy of the cured article associated with the composition may be compromised. On the other hand, if the molecular weight is too low, the curability and/or mechanical properties of the associated composition may be adversely affected.

In a preferred embodiment, UPy of the self-healing oligomer according to structure (VII) is represented by the either of the following structures (VIII-a) or (VIII-b):

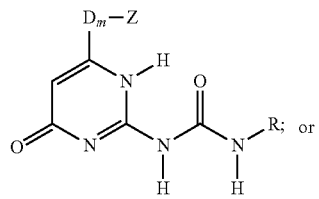

(VIII-a)

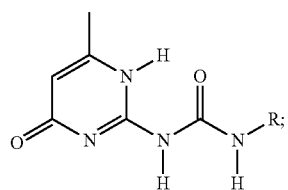

(VIII-b)

wherein R represents the remaining portion of structure (VII), and D, m, and Z are as defined with respect to structure (VII), above.

In addition to the specified UPy group, the self-healing oligomer according to structure (VII) may possess additional self-healing groups. These groups may comprise additional UPy groups, other hydrogen bonding groups, or other self-healing moieties altogether, such as disulfide groups and/or urea groups as described elsewhere herein, supra. In an embodiment, X is a multi-hydrogen bonding group, a disulfide group, or a urea group. The aforementioned hydrogen bonding group may also be a UPy group.

Several specific example self-healing oligomers according to structure (VII) may be contemplated. Among them include linear or branched structures, those with varying linking groups and/or 3 or more urethane linking groups, and those terminated with acrylate, hydroxyl, amine, cyanate, and/or UPy groups. Two non-limiting examples of such specific potential oligomer structures according to structure (VII) include, without limitation, the following:

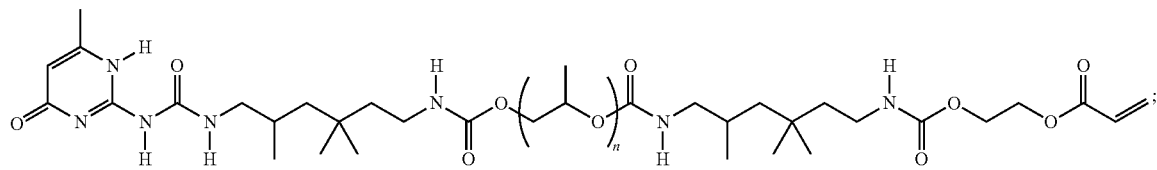

(IX)

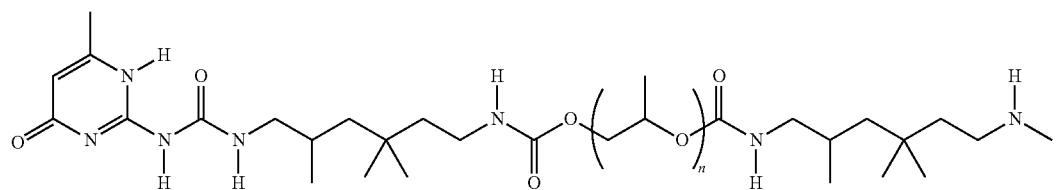

(X)

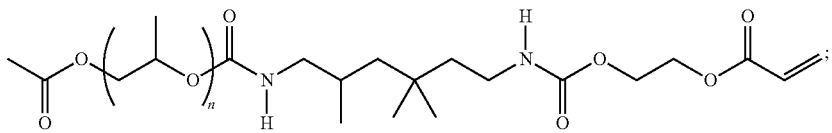

wherein n is an integer such that the $MW_{theo}$ of the structure is maintained to between 500 and 8000 g/mol, preferably from 500 to 4500 g/mol.

As can be seen above, the self-healing oligomer according to structure (IX) is linear, it possesses 3 linking urethane groups (it being presumed for purposes herein that the urethane group adjacent to the UPy group is associated therewith), and is terminated with an acrylate group on the chain terminus opposite the UPy group. Other variations of this can be contemplated by the person of ordinary skill in the art to which this invention applies in accordance with the guidelines consistent with self-healing oligomers according to structure (VII).

Still further examples of specific self-healing oligomers according to structure (VII) and in accordance with the second aspect of the current invention include:

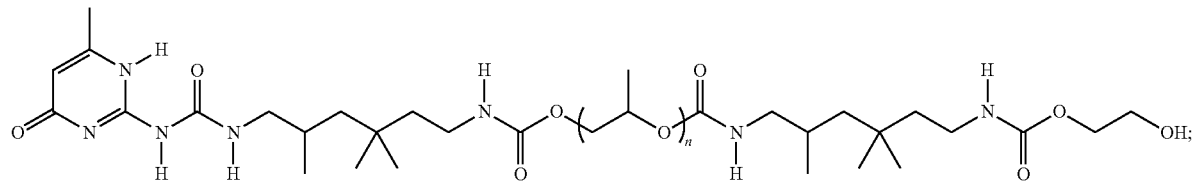
(XI)

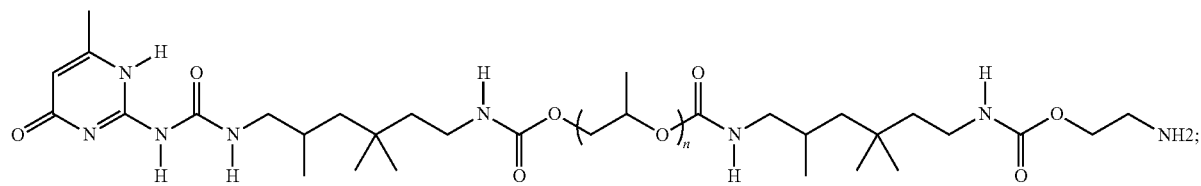
(XII)

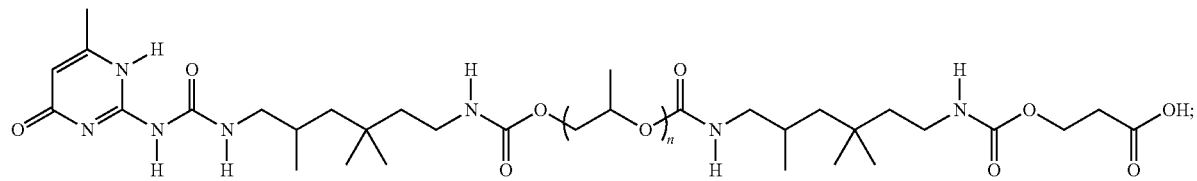
(XIII)

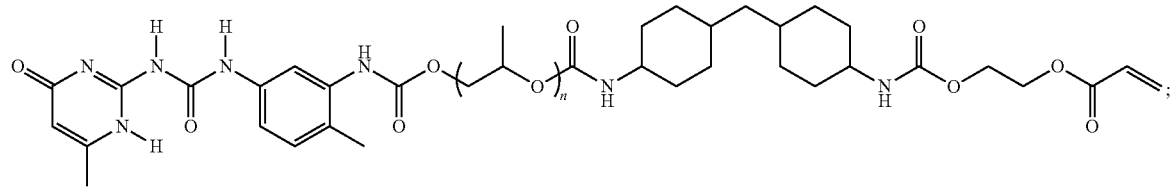
(XIV)

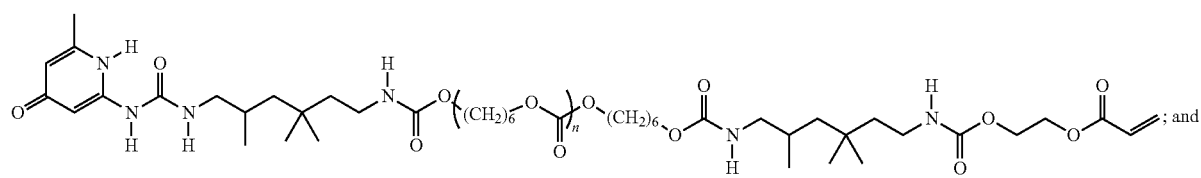
(XV)

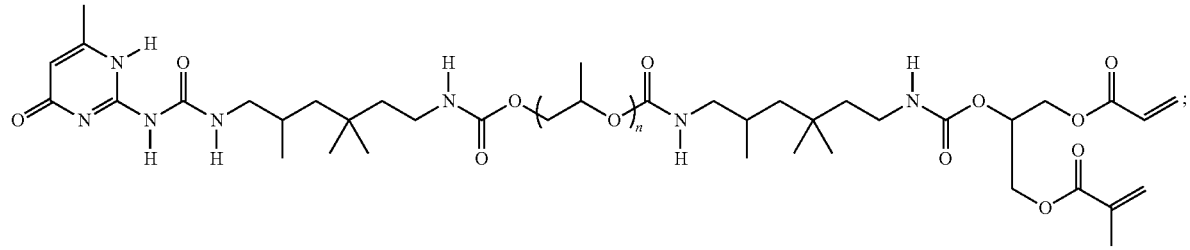
(XVI)

Poly MW 1000 wherein n is an integer such that the $MW_{theo}$ of the structure is maintained to between 500 to 4500 g/mol.
Still further specific examples of self-healing oligomers according to structure (VII) include branched structures, such as one or more of the following:
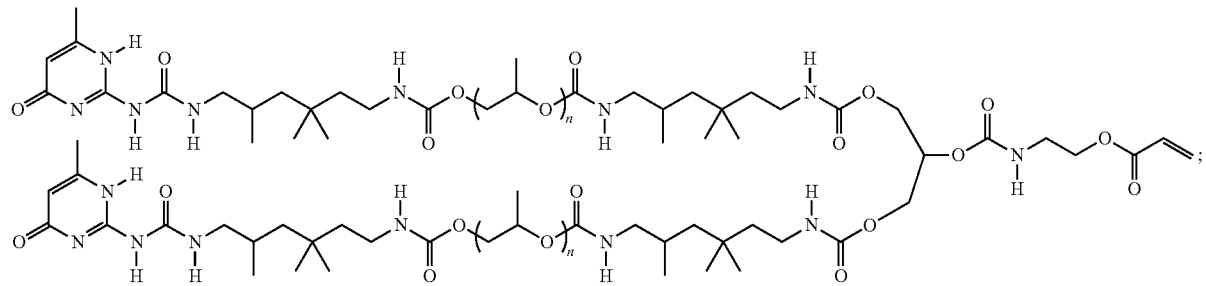
(XVII)
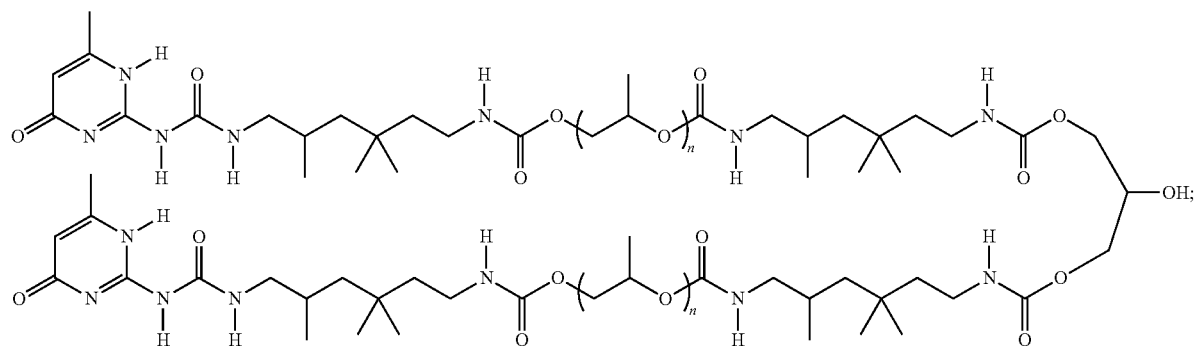
(XVIII)
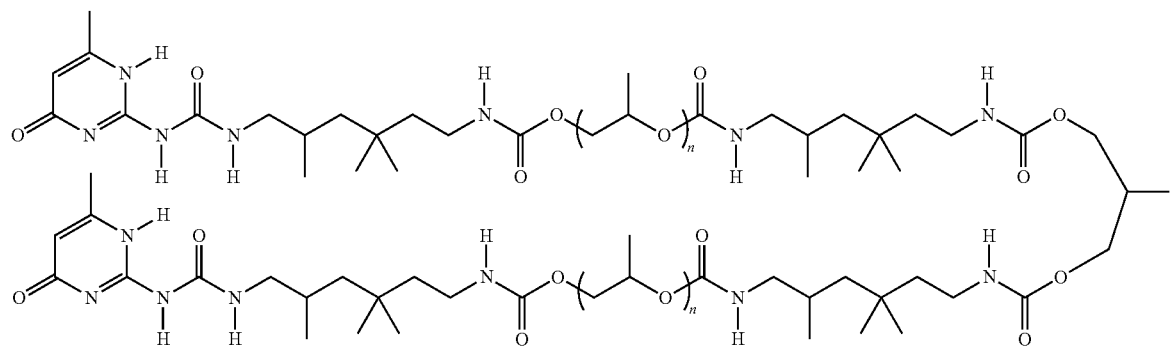
(XIX)
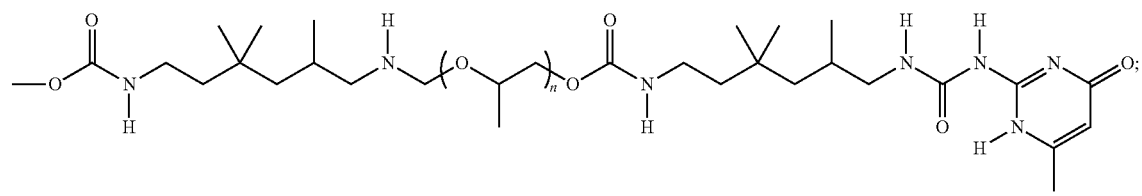

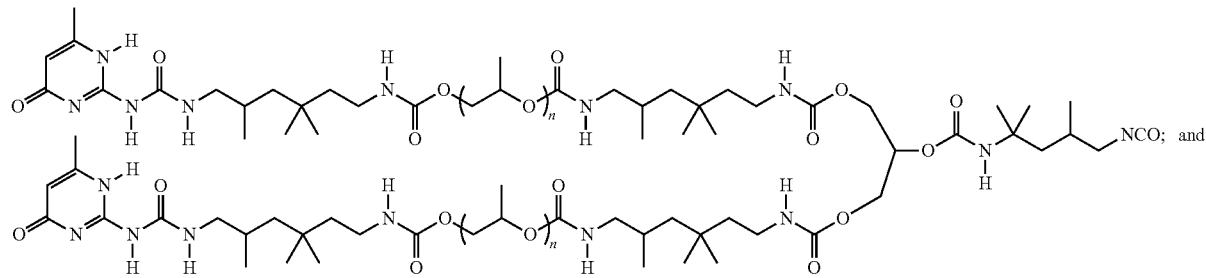

(XX)

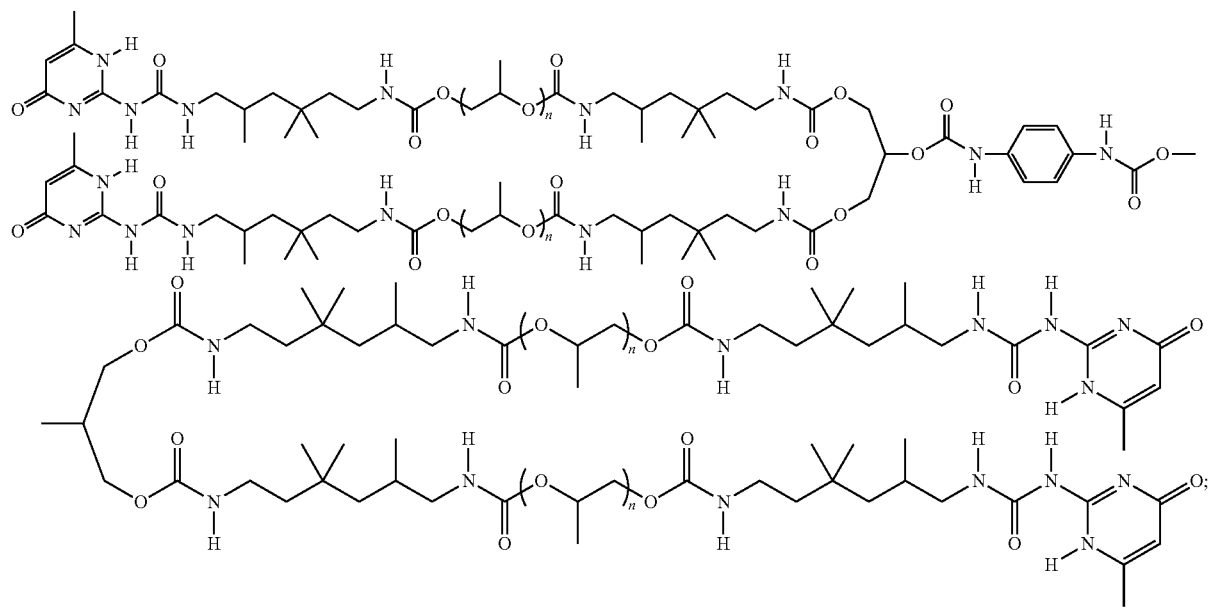

(XXI)

wherein n is an integer such that the MW$_{theo}$ of the structure is maintained to between 500 and 18000 g/mol, or from 500 to 4500 g/mol.

The foregoing example structures (IX) through (XXI) are not intended to be limiting examples. Other variations of the foregoing structures (IX) through (XXI) can be contemplated by the person of ordinary skill in the art to which this invention applies in accordance with the broader guidance of self-healing oligomers according to structure (VII) described elsewhere herein.

In various embodiments, the self-healing oligomer according to structure (VII) comprises polymerizable moieties as well. If present, the polymerizable moieties preferably comprise radiation curable moieties, such as vinyl, acryloyloxy, methacryloyloxy and maleimido groups, although other reactive groups such as, without limitation hydroxy, amino, alkynyl, azido, aziridino, silyl, siloxy, silylhydride, thio, isocyanato, protected isocyanato, epoxy, aziridino, carboxylate, F, Cl, Br, I, or similar groups may also be used.

In an embodiment, the self-healing oligomer according to structure (VII) comprises (meth)acrylate groups. If the self-healing oligomer according to structure (VII) is present as part of a composition of which it forms a part or whole of the self-healing component, said self-healing component may possess any suitable quantity of (meth)acrylate groups, such as from 0.015 to 0.1 equivalents of (meth)acrylate groups per 100 g of the composition, or from 0.03 to 0.1 equivalents, or from 0.037 to 0.1 equivalents, or from 0.03 to 0.08 equivalents, or from 0.03 to 0.05 equivalents, or from 0.037 to 0.08 equivalents, or from 0.037 to 0.05 equivalents.

In other embodiments, the polymerizable groups may also or alternatively be present in other components of the entire formulation. In an embodiment, the composition with which the self-healing oligomer according to structure (VII) is incorporated possesses (meth)acrylate groups, wherein such (meth)acrylate groups are present in the self-healing component, the monomer component, and the oligomer component; or in the self-healing component and the monomer component; or in the self-healing component and the oligomer component; or in the monomer component and the oligomer component; or simply in the monomer component; or simply in the oligomer component. In such embodiments, the composition may possess any suitable amount of (meth)acrylate functionality, such as from 0.1 to 0.4 equivalents of (meth)acrylate groups per 100 g of the composition, or from 0.1 to 0.3 equivalents, or from 0.1 to 0.25 equivalents, or from 0.15 to 0.4 equivalents, or from 0.15 to 0.3 equivalents, or from 0.15 to 0.25 equivalents, or from 0.15 to 0.2 equivalents.

Inventors have also discovered that the effectiveness and usability of coatings (such as optical fiber coatings) comprising self-healing oligomers according to structure (VII) may be increased if the amount of polymerizable groups in the composition relative to self-healing moieties are maintained to within certain ratios relative to each other. In an embodiment, therefore, the composition possesses a ratio of equivalents of polymerizable groups to equivalents of self-healing groups in the composition of less than 14, or less than 10, or less than 8, or less than 6, or less than 5, or from 1 to 14, or from 1 to 10, or from 1 to 8, or from 1 to 6, or from 1 to 5, or from 3 to 10, or from 3 to 8, or from 3 to 5.

In order to quantify effectively the specific efficacy of any self-healing oligomer or oligomers according to structure (VII), it may be preferable to measure the self-healing and/or stress relaxation properties of a cured product of a composition into which said self-healing oligomer or oligomers according to structure (VII) have been incorporated.

Specifically, it is possible to assess the self-healing and/or stress-relaxation abilities when subjecting a fixed quantity of uncured composition according to a predefined, fixed set of curing conditions, and then measuring certain physical properties both after initial cure, and then at a subsequent time after having damaged the cured product in some controlled way and allowing a period of time for it to self-heal as is described elsewhere herein, above.

A third aspect of the current invention is a multi-layered optical device comprising a polymeric layer disposed between a first optical element layer and a second optical element layer, wherein each of the polymeric layer, the first optical element layer, and the second optical element layer comprise a first surface and a second surface, wherein the first surface of the polymeric layer is in contact with the first surface of the first optical element layer and the second surface of the polymeric layer is in contact with the first surface of the second optical element layer, wherein the polymeric layer comprises a product of a composition comprising a self-healing component, wherein said self-healing component consists of molecules comprising self-healing moieties, wherein said composition possesses either: (a) greater than 30 wt. %, relative to the weight of the entire composition, of the self-healing component; or (b) greater than 0.015 equivalents of self-healing moieties per 100 g of the composition.

A non-limiting example of a multi-layered optical device according to the third aspect is depicted in FIG. 1. Turning to FIG. 1, multi-layered optical device 1 includes a polymeric layer 2, which may be a film, coating, adhesive, or primer, and which polymeric layer 2 is sandwiched between two optical element layers, which are preferably constructed of glass or a polymeric material, or are coatings from the vapor deposition of metals and/or metal oxides. The first optical element layer 3 possesses a first surface 5 and a second surface 6, wherein the first surface 5 is in contact with, and preferably chemically bonded to, a first surface 8 of polymeric layer 2. The second surface 7 of polymeric layer 2, meanwhile, is in contact with and preferably chemically bonded to first surface 10 of the second optical element layer 4. Optical element layer 4 further comprises a second surface 9.

The multi-layered optical device is preferably constructed such that the polymeric layer is capable, after being cut or separated into multiple parts, of reintegrating under appropriate mechanical, thermal, or UV conditions. This may be accomplished by constructing the polymeric layer from a composition as described according to any of the embodiments of the first aspect of the present invention, and/or using any of the oligomers described according to any of the embodiments of the second aspect of the current invention.

In an embodiment, the composition from which the polymeric layer is formed comprises: optionally, a monomer component; optionally, an oligomer component; an initiator component; and/or additives. Examples of suitable constituents to the monomer component, oligomer component, initiator component, and additives are described elsewhere herein.

In multi-layered optical devices according to the third aspect, specialized additives may be used. Such additives include adhesion promoters, photochromic dyes, thermochromic dyes, liquid crystals, laser dyes, fluorescent dyes, OLED dyes, dichroic dyes, or fillers. The fillers may comprise thermally- or electrically-conductive fillers.

In an embodiment, it is preferable that the polymeric layer, and optionally also the entire multi-layered optical device, is substantially transparent, as in many applications of multi-layered optical devices according to this third aspect, the transmission of light should proceed through the entire device in an efficient and unobstructed manner. In an embodiment, therefore, the polymeric layer is configured to possess a light transmittance of greater than or equal to 80%, or greater than 90%, or greater than 95%, or greater than 98%, when tested according to ISO 13468-1:2019. However, the polymeric layer need not possess a high transmittance of light in all embodiments; in an optical fiber configuration, for example, this need not be the case.

The polymeric layer can vary in thickness to any suitable amount depending on the application need. However, in many embodiments, the polymeric layer has a thickness of less than or equal to 500 microns (μm), or less than 250 μm, or less than 100 μm, or less than or equal to 50 μm, and/or greater than or equal to 1 μm, or greater than 5 μm, or greater than 15 μm, or greater than 20 μm.

The multi-layered optical device may be a self-healing coated optical fiber. The self-healing coated optical fiber may contain any number of coating layers surrounding the glass optical fiber, however in a preferred embodiment, the self-healing coated optical fiber contains at least two layers. In such embodiments, the layer which is disposed around and in contact with the fiber is a primary coating, whereas the layer disposed around and in contact with the primary coating layer is referred to as a secondary coating. Additional outer layers may be referred to as tertiary, etc. layers, or if comprising pigments or inks to enable fiber identification, such layers may be referred to as simply an ink layer. If an ink layer is present, it is preferably the outermost layer of the self-healing coated optical fiber. Other multi-layer coating systems are known and are disclosed in, e.g., WO2017173296, which is hereby incorporated by reference.

It is typically desirable, although not necessary, for the self-healing optical fiber to be configured such that the self-healing coating layer(s) possess a glass transition temperature that is less than the temperature at which healing is desired. Without wishing to be bound by any theory, it is believed that the self-healing capability of a coating is inherently tied to the segmental motion of the polymer chains. Thus, as crystalline structures or structures in glassy state are believed to minimize the ability for movement and/or re-arrangement of self-healing moieties present in the coating, it is preferable to prevent the coating from reaching a crystalline or glassy state (for non-crystalline, amorphous resins). Therefore, in an embodiment, the glass transition temperature of the coating layer and/or the primary coating layer is less than 25° C., or less than 20° C., or less than 10° C., or less than 0° C., or less than −10° C., or less than −20° C., or less than −30° C.

Improved self-healing coatings, such as coatings for optical fibers, of the current invention can be formulated via the selection of components specified above herein, and further readily tuned by those of ordinary skill in the art to which this invention applies by following the formulation guidelines herein, as well as by extrapolating from the general approaches taken in the embodiments illustrated in the examples below. The following such examples further illustrate the invention but, of course, should not be construed as in any way limiting its scope.

Examples

These examples illustrate embodiments of the instant invention. Table 1 describes the various components of the compositions used in the present examples. Table 2 describes various further aspects of the oligomers created from the reagents in Table 1, the synthesis for which is described further below. Tables 3A-3D indicate test results for entire formulations created from the components described in Table 1 and the oligomers characterized in Table 2.

TABLE 1

Formulation Components

| Component | Chemical Descriptor (Tradename) | Supplier/Manufacturer |
| --- | --- | --- |
| AHMP | 2-amino-4-hydroxy-6-methyl-pyrimidine | Hunan HuaTeng Pharmaceutical |
| TMDI | Trimethylhexamethylene diisocyanate (VESTANAT TMDI) | EVONIK |
| IPDI | Isophorone diisocyanate (Desmodur I) | Covestro |
| PPG-600 | Polypropylene glycol | Sino-Japan |
| PPG-1000 | Polypropylene glycol (Arcol ® PPG-1011) | Covestro |
| PPG-2000 | Polypropylene glycol (Arcol ® PPG-2000) | Covestro |
| Disulfide diol | 2-Hydroxyethyl disulfide | Sigma-Aldrich |
| PDMS-diol 550 | Poly(dimethylsiloxane), hydroxy terminated average Mn ~550, | Sigma-Aldrich |
| PDMS-diol 2500 | Poly(dimethylsiloxane), bis(3-aminopropyl) terminated average Mn ~2,500 | Sigma-Aldrich |
| HDMA | Hexamethylenediamine | Sigma-Aldrich |
| HEA | 2-Hydroxyethyl acrylate | BASF |
| HEMA | 2-Hydroxyethyl methacrylate | LOTTE |
| 2-EHA | 2-Ethylhexyl acrylate | FORMOSA |
| Ethylene glycol | Ethylene glycol | Sigma-Aldrich |
| AMG | 3-(Acryloyloxy)-2-hydroxypropyl methacrylate | Sigma-Aldrich |
| Glycerol | Glycerol | Sigma-Aldrich |
| IEA | 2-isocyanatoethyl acrylate | Sigma-Aldrich |
| 2-ethyl-1-hexylamine | 2-ethyl-1-hexylamine | Sigma-Aldrich |
| EOEOEA | 2-(2-Ethoxyethoxy)ethyl acrylate (AgiSyn ™ 2880) | DSM |
| AgiSyn 2884 | Pentaerythritol acrylate (AgiSyn ™ 2884) | DSM |
| AgiSyn 2830 | Dipentaerythritol acrylate (AgiSyn ™ 2830) | DSM |
| TMPTA | Trimethylolpropane triacrylate (SR351) | Sartomer |
| VC | N-Vinyl caprolactam | BASF |
| TPO | Diphenyl (2,4,6-trimethylbenzoyl) phosphine oxide | Omnirad TPO |
| Irganox 1035 | Thiodiethylene bis[3-(3,5-di-tert-butyl-4-hydroxyphenyl)propionate] (Irganox ® 1035) | BASF |
| Silyl Acrylate | Trimethoxysiliylpropyl acrylate ((3-Acryloxy-propyl) Trimethoxysilane, 96%) | Gelest |
| DBTDL | Dibutylin dilaurate | Evonik |
| BHT | Butylated hydroxytoluene (food grade) | Lanxess, BASF |
| Butyl acetate | Butyl acetate | Sigma-Aldrich |

Synthesis of Oligomers

The oligomers used herein were made resulting in a mixture having a statistical distribution of molecular weight that can be easily recognized by those skilled in the art. The structures in this section, and elsewhere herein, only show the designed averaged, or "ideal" structure, unless otherwise noted.

Specifically to create oligomer 1, a mixture of AHMP (2-amino-4-hydroxy-6-methyl-pyrimidine, 12.5 g, 0.1 mol) and TMDI (42 g, 0.2 mol) was placed in a four-necked flask (500 ml) and purged with nitrogen. The mixture was then stirred at 145° C. for 3.5 hours under nitrogen before an addition of PPG-1000 (100 g, 0.1 mol) and 0.03 g dibutyltin dilaurate (DBTDL, 0.03 g, 0.0475 mmol). The resulting mixture was further stirred at 90° C. for 3 hours and then cooled to 80° C. The resulting reaction mixture was next purged with a gas consisting of air/nitrogen in a 1:3 ratio by volume. Then, DBTDL (0.05 g, 0.079 mmol), BHT, (0.24 g, 1.1 mmol), and 2-hydroxyethyl acrylate (HEA, 11.6 g, 0.1 mol) were added sequentially. While still under the purge of the 1:3 air/nitrogen gaseous mixture, the reaction mixture was further stirred at 80° C. for another 2 hours to yield the final product mixture with an average structure (XXII) shown below as a viscous liquid. The product was then available to be used in subsequent formulation without further purification. The designed structure (XXII) is depicted below:

(XXII)

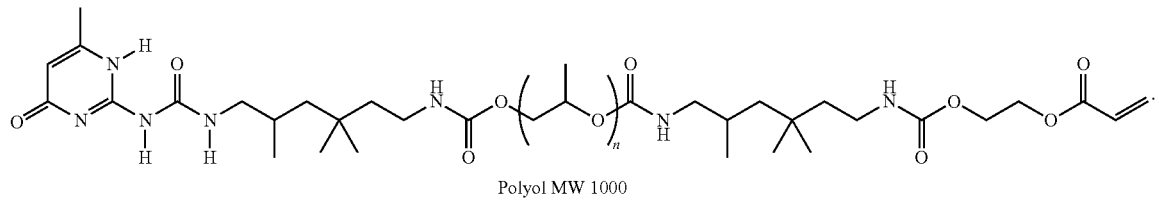

Polyol MW 1000

To create oligomer 2, the procedures resulting in oligomer 1 synthesis described above were followed, except that 2-hydroxyethyl methacrylate (HEMA) was used in place of HEA. The viscous liquid product was a mixture of oligomers with an average structure (XXIII). The product was then available to be used in subsequent formulation without further purification. The designed structure (XXIII) appears below:

(XXIII)

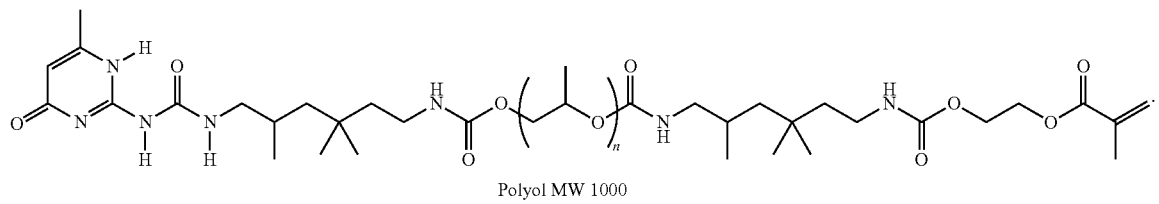

Polyol MW 1000

To create oligomer 3, the procedures resulting in oligomer 1 synthesis described above were followed, except that 2-ethyl-1-hexylamine was used in place of AHMP. The resulting viscous liquid product was provided as a mixture of oligomers without further purification, and having an average structure (XXIV) as shown below:

(XXIV)

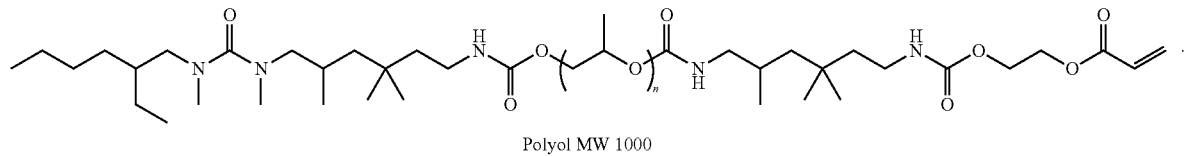

Polyol MW 1000

To create oligomer 4, a mixture of AHMP (12.5 g, 0.1 mol) and IPDI (44.4 g, 0.2 mol) was placed in a four-necked flask (500 ml) and then purged with nitrogen. The resulting mixture was then stirred at 155° C. for 3 hours under nitrogen before the addition of PPG-1000 (100 g, 0.1 mol) and 0.03 g dibutyltin dilaurate (DBTDL, 0.03 g, 0.0475 mmol). The resulting mixture was then stirred at 115° C. for 3 hours and then cooled to 90° C. The reaction mixture was then purged with a gaseous mixture consisting of air and nitrogen in a 1:3 ratio by volume. Then, DBTDL (0.05 g, 0.079 mmol), BHT (0.24 g, 1.1 mmol), and HEA (11.6 g, 0.1 mol) were each added sequentially. While still under the purge of the 1:3 air/nitrogen mixture, the reaction mixture was further stirred at 90° C. for another 2 hours to yield the final product mixture with an average structure (XXV) as a viscous liquid. The product was then available to be used in subsequent formulation without further purification. The designed structure (XXV) appears below:

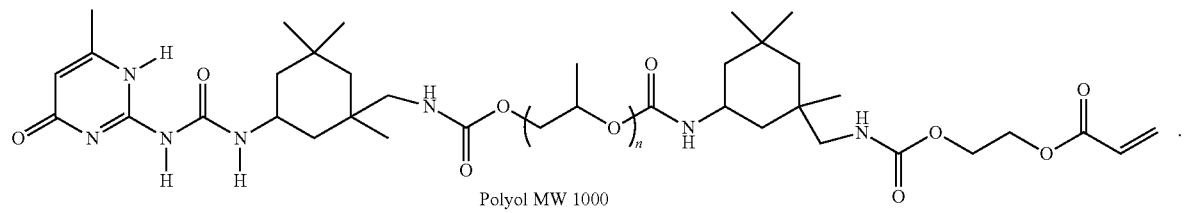

(XXV)

To create oligomer 5, the procedures resulting in oligomer 4 synthesis described above were followed, except that HEMA was used in place of HEA. The viscous liquid product was a mixture of oligomers with an average structure (XXVI). The product was then available to be used in subsequent formulation without further purification. The designed structure (XXVI) appears below:

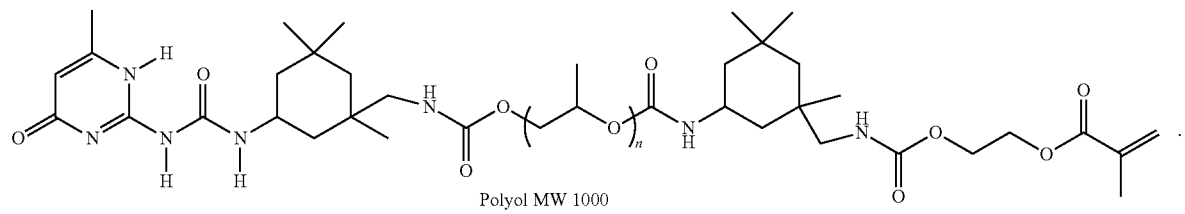

(XXVI)

To create oligomer 6, a mixture of AHMP (8.75 g, 0.07 mol) and IPDI (44.4 g, 0.2 mol) was placed in a four-necked flask (250 ml) and then purged with nitrogen. The mixture was then stirred at 155° C. for 3 hours under nitrogen, after which an addition of PPG-1000 (100 g, 0.1 mol) and 0.03 g DBTDL (0.03 g, 0.0475 mmol) was made. The resulting mixture was stirred at 115° C. for 3 hours and then cooled to 90° C. The reaction mixture was then purged with a gaseous mixture of air and nitrogen in a 1:3 ratio by volume. Next, DBTDL (0.05 g, 0.079 mmol), BHT (0.24 g, 1.1 mmol), and HEA (15.08 g, 0.13 mol) were added sequentially. While still under the purge of the 1:3 air/nitrogen mixture, the reaction mixture was subsequently stirred at 90° C. for another 2 hours to yield the final oligomer mixture with an average structure (XXVII) as drawn below as a viscous liquid. The product was then available to be used in subsequent formulation without further purification:

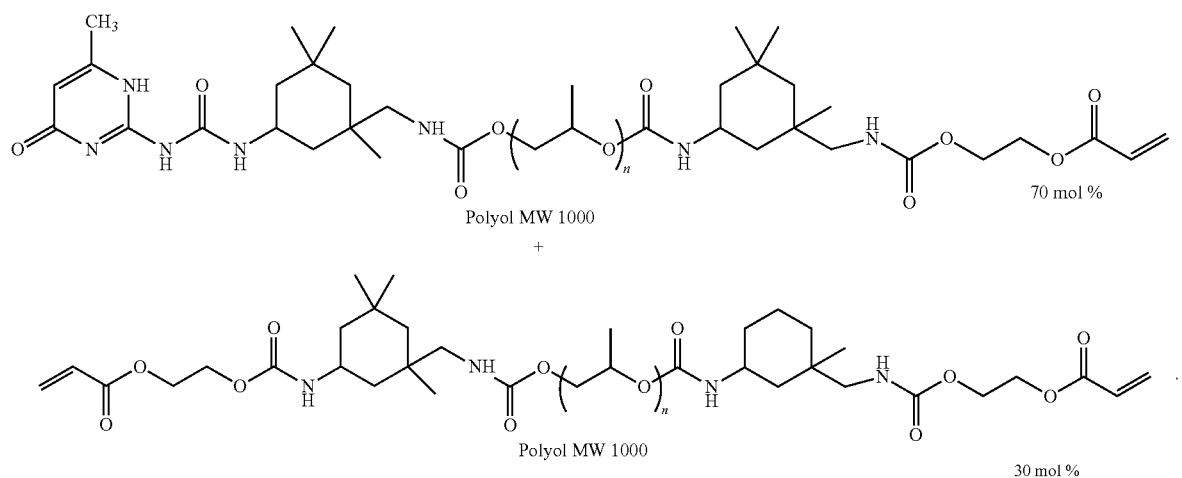

(XXVII)

To create oligomer 7, the procedure used to synthesize oligomer 6 as described above was followed except that 2-ethyl-1-hexylamine was used in place of AHMP. The resulting viscous liquid product was provided as a mixture of oligomers without further purification having an average structure (XXVIII) as shown below:

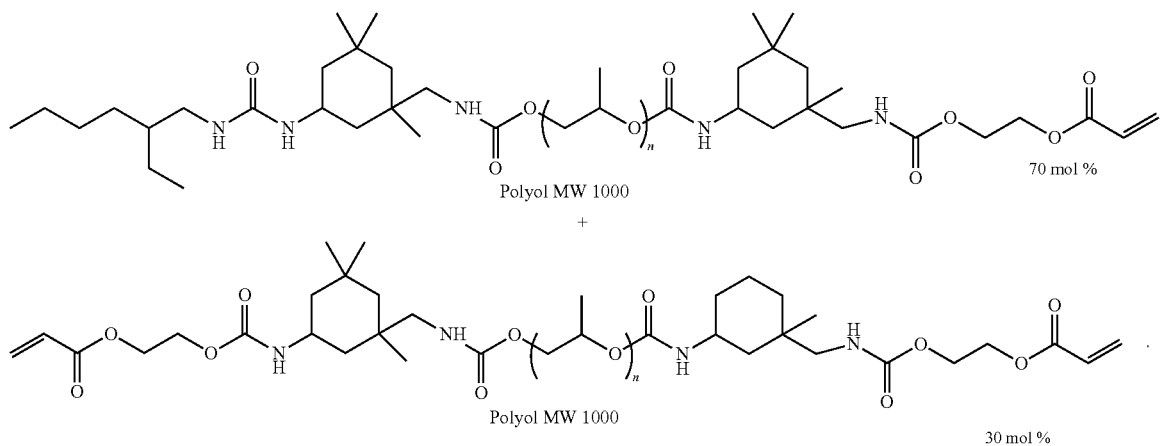

To create oligomer 8, the procedures resulting in oligomer 1 synthesis described above were followed, except that PPG-600 was used in place of PPG-1000. The viscous liquid product was a mixture of oligomers with an average structure (XXIX). The product was then available to be used in subsequent formulation without further purification. The designed structure (XXIX) appears below:

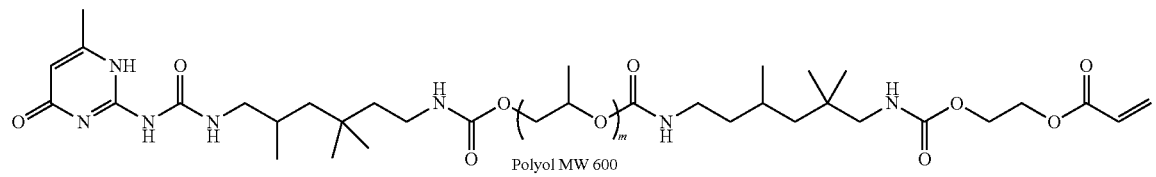

To create oligomer 9, the procedures resulting in oligomer 1 synthesis described above were followed, except that PPG-2000 was used in place of PPG-1000. The viscous liquid product was a mixture of oligomers with an average structure (XXX). The product was then available to be used in subsequent formulation without further purification. The designed structure (XXX) appears below:

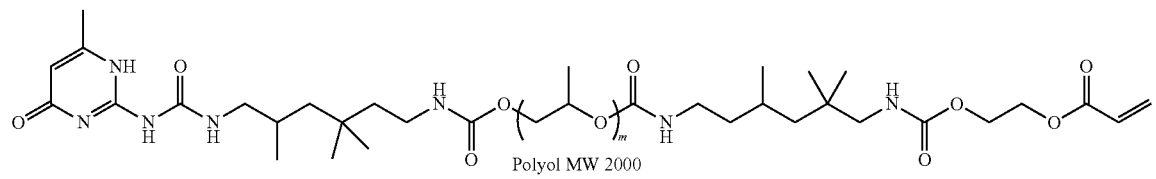

To create oligomer 10, a mixture of AHMP (15.2 g, 0.12 mol) and TMDI (51.58 g, 0.24 mol) was placed in a four-necked flask (250 ml) and purged with nitrogen. The mixture was then stirred at 145° C. for 3.5 hours under nitrogen before an addition of disulfide diol (2-hydroxyethyl disulfide, 18.82 g, 0.12 mol), DBTDL (0.02 g, 0.0317 mmol) and butyl acetate (40 g). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (14.2 g, 0.12 mol) were added sequentially. While still under the purge of the 1:3 air/nitrogen gaseous mixture, the reaction mixture was further stirred at 90° C. for another 2 hours to yield the final product mixture with an average structure (XXXI) shown below as a viscous liquid. The product was then available to be used in subsequent formulation without further purification. The designed structure (XXXI) is depicted below:

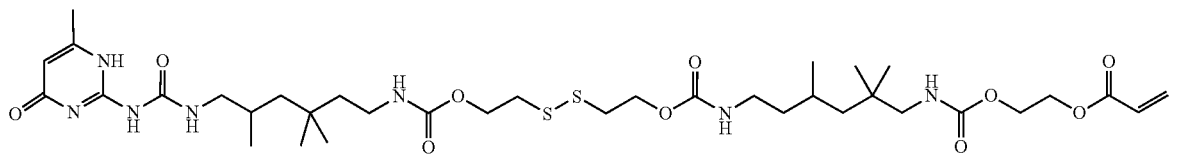

(XXXI)

To create oligomer 11, the procedures resulting in oligomer 1 synthesis described above were followed, except that 3-(acryloyloxy)-2-hydroxypropyl methacrylate (AMG) was used in place of HEA. The viscous liquid product was a mixture of oligomers with an average structure (XXXII). The product was then available to be used in subsequent formulation without further purification. The designed structure (XXXII) appears below:

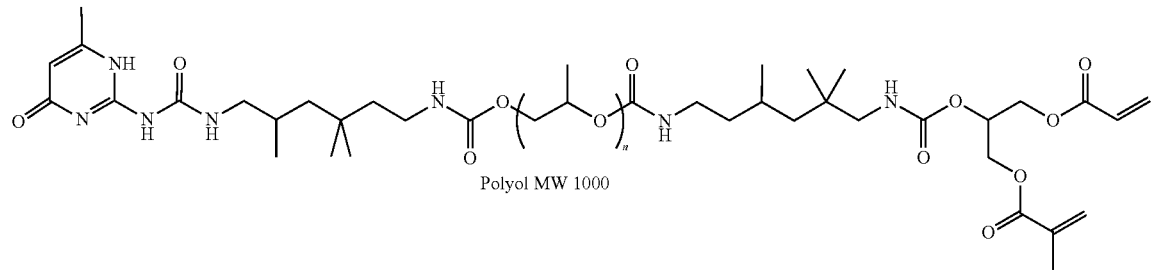

(XXXII)

To create oligomer 12, a mixture of AHMP (7.42 g, 0.059 mol) and TMDI (25.19 g, 0.12 mol) was placed in a four-necked flask (250 ml) and purged with nitrogen. The mixture was then stirred at 145° C. for 3.5 hours under nitrogen before an addition of PPG-1000 (59.8 g, 0.0598 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), IEA (2-isocyanatoethyl acrylate, 4.64 g, 0.03 mol) and glycerol (2.75 g, 0.03 mol) were added sequentially. While still under the purge of the 1:3 air/nitrogen gaseous mixture, the reaction mixture was further stirred at 90° C. for another 2 hours to yield the final product mixture with an average structure (XXXIII) shown below as a viscous liquid. The product was then available to be used in subsequent formulation without further purification. The designed structure (XXXIII) is depicted below:

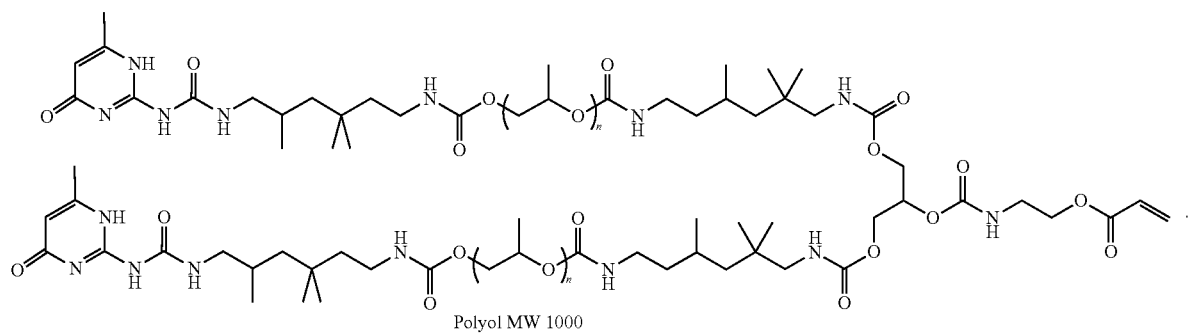

(XXXIII)

To create oligomer 13, a mixture of AHMP (7.71 g, 0.062 mol) and TMDI (26.16 g, 0.124 mol) was placed in a four-necked flask (250 ml) and purged with nitrogen. The mixture was then stirred at 145° C. for 3.5 hours under nitrogen before an addition of PPG-1000 (62.1 g, 0.062 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and ethylene glycol (3.83 g, 0.062 mol) were added sequentially. While still under the purge of the 1:3 air/nitrogen gaseous mixture, the reaction mixture was further stirred at 90° C. for another 2 hours to yield the final product mixture with an average structure (XXXIV) shown below as a viscous liquid. The product was then available to be used in subsequent formulation without further purification. The designed structure (XXXIV) is depicted below:

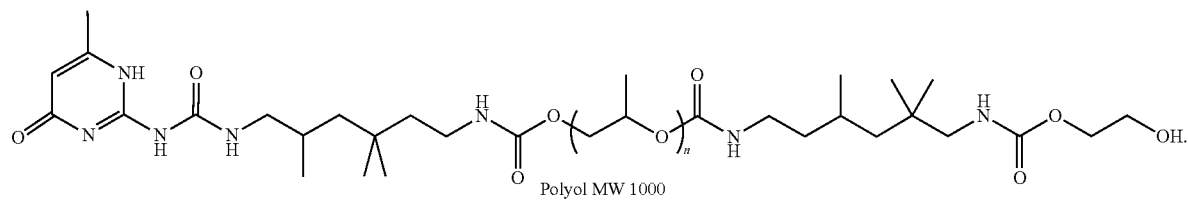

(XXXIV)

To create oligomer 14, a mixture of AHMP (7.58 g, 0.06 mol) and TMDI (25.68 g, 0.12 mol) was placed in a four-necked flask (250 ml) and purged with nitrogen. The mixture was then stirred at 145° C. for 3.5 hours under nitrogen before an addition of PPG-1000 (57.8 g, 0.0578 mol), PDMS-diol 550 (hydroxy-terminated poly(dimethylsiloxane), Mn=550, 1.67 g, 0.003 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (7.07 g, 0.06 mol) were added sequentially. While still under the purge of the 1:3 air/nitrogen gaseous mixture, the reaction mixture was further stirred at 90° C. for another 2 hours to yield the final oligomer mixture with an average structure (XXXV) shown below as a viscous liquid. The product was then available to be used in subsequent formulation without further purification. The designed structure (XXXV) is depicted below:

(XXXV)

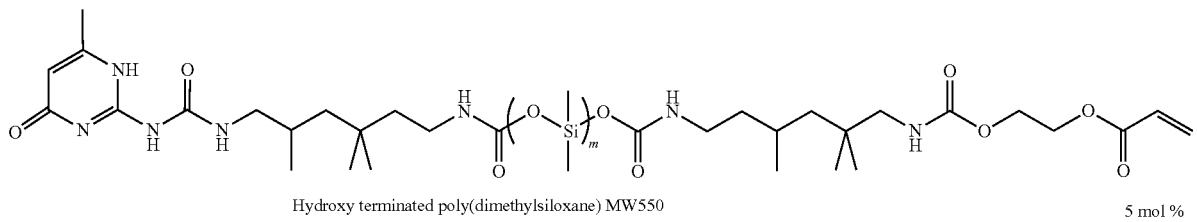

Hydroxy terminated poly(dimethylsiloxane) MW550     5 mol %

+

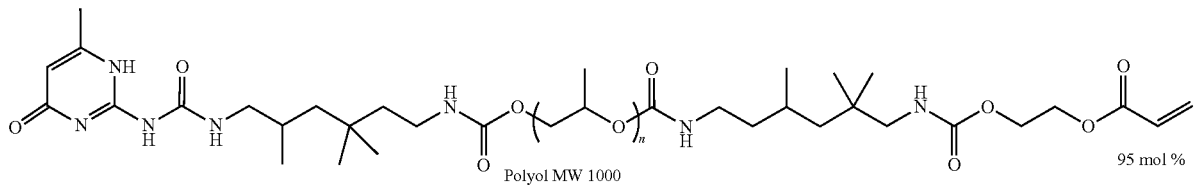

Polyol MW 1000     95 mol %

To create oligomer 15, the procedures resulting in oligomer 14 synthesis described above were followed, except that PDMS-diol 2500 (bis(3-aminopropyl) terminated poly(dimethylsiloxane), Mn=2500), was used in place of PDMS-diol 550. The viscous liquid product was a mixture of oligomers with an average structure (XXXVI). The product was then available to be used in subsequent formulation without further purification. The designed structure (XXXVI) appears below:

(XXXVI)

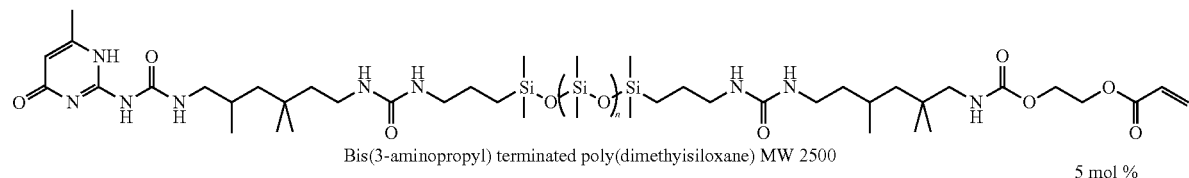

Bis(3-aminopropyl) terminated poly(dimethyisiloxane) MW 2500     5 mol %

+

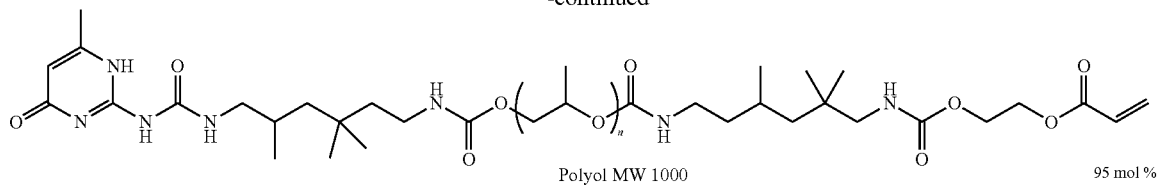

Polyol MW 1000     95 mol %

To create oligomer 16, a mixture of AHMP (5.89 g, 0.047 mol) and TMDI (19.95 g, 0.094 mol) was placed in a four-necked flask (250 ml) and purged with nitrogen. The mixture was then stirred at 145° C. for 3.5 hours under nitrogen before an addition of PPG-1000 (33.05 g, 0.033 mol), PDMS-diol 2500 (35.43 g, 0.014 mol) DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (5.48 g, 0.047 mol) were added sequentially. While still under the purge of the 1:3 air/nitrogen gaseous mixture, the reaction mixture was further stirred at 90° C. for another 2 hours to yield the final oligomer mixture with an average structure (XXXVII) shown below as a viscous liquid. The product was then available to be used in subsequent formulation without further purification. The designed structure (XXXVII) is depicted below:

(XXXVII)

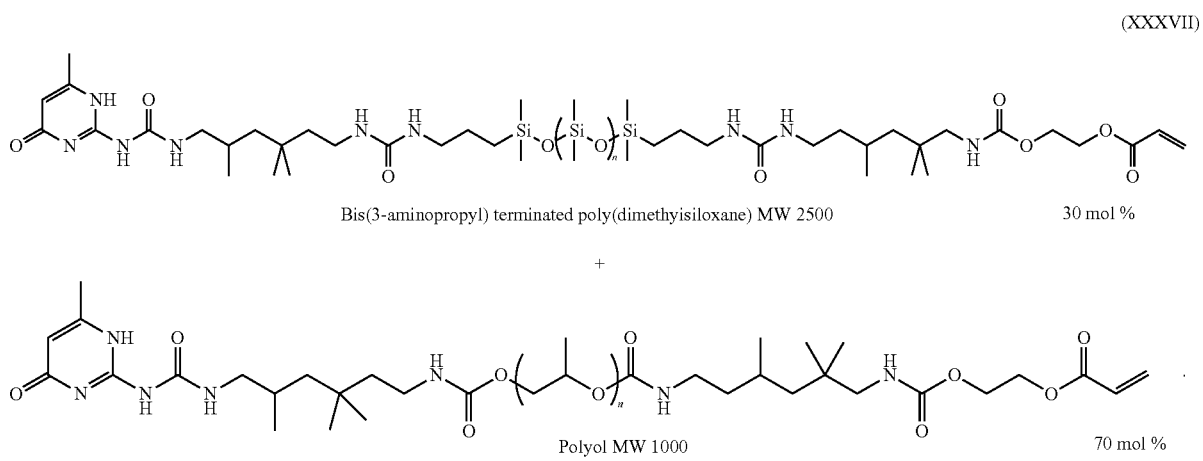

To create oligomer 17, a mixture of 2-ethyl-1-hexylamine (15.66 g, 0.121 mol) and TMDI (51.29 g, 0.243 mol) was placed in a four-necked flask (250 ml) and purged with nitrogen. The mixture was then stirred at 125-145° C. for 3.5 hours under nitrogen before an addition of disulfide diol (18.77 g, 0.121 mol) and DBTDL (0.02 g, 0.0317 mmol). The resulting mixture was further stirred at 100° C. for 3 hours and then cooled to 90° C. The resulting reaction mixture was next purged with a gas consisting of air/nitrogen in a 1:3 ratio by volume. Then, DBTDL (0.03 g, 0.0475 mmol), BHT (0.15 g, 0.68 mmol), and HEA (14.08 g, 0.121 mol) were added sequentially. While still under the purge of the 1:3 air/nitrogen gaseous mixture, the reaction mixture was further stirred at 90° C. for another 2 hours to yield the final product mixture with an average structure (XXXVIII) shown below as a viscous liquid. The product was then available to be used in subsequent formulation without further purification. The designed structure (XXXVIII) is depicted below:

(XXXVIII)

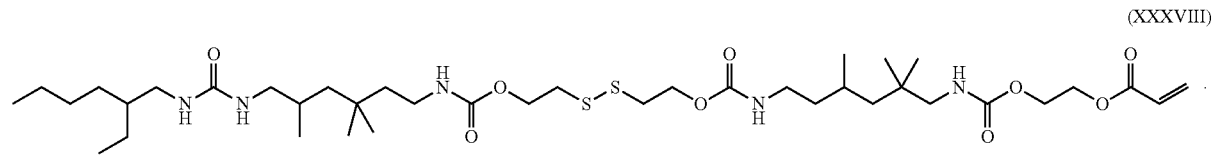 [SMILES: C=CC(=O)OCCOC(=O)NCC(C)(C)CC(C)CCNC(=O)OCCSSCCOC(=O)NCCC(C)(C)CC(C)CNC(=O)NCC(CC)CCCC]

The specific oligomer reactants described above are depicted in Table 2 below.

TABLE 2

Reactants for Oligomers 1-17 (in mol ratio)

| Reactant | Molar Mass (g/mol) | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| AHMP | 125.131 | 1 | 1 | | 1 | 1 | 0.7 | | 1 | 1 | 1 | 1 | 1 | 1 | 1 | 1 | 1 | |
| TMDI | 210.27 | 2 | 2 | 2 | | | | | 2 | 2 | 2 | 2 | 2 | 2 | 2 | 2 | 2 | 2 |
| IPDI | 222.3 | | | | 2 | 2 | 2 | 2 | | | | | | | | | | |
| PPG-600 | ~600 | | | | | | | | 1 | | | | | | | | | |
| PPG-1000 | ~1000 | 1 | 1 | 1 | 1 | 1 | 1 | 1 | | | | 1 | 1 | 1 | 0.95 | 0.95 | 0.7 | |
| PPG-2000 | ~2000 | | | | | | | | | 1 | | | | | | | | |
| Disulfide diol | 154.25 | | | | | | | | | 1 | | | | | | | | 1 |
| PDMS-diol 550 | ~550 | | | | | | | | | | | | | | .05 | | | |
| PDMS-diol 2500 | ~2500 | | | | | | | | | | | | | | | 0.05 | 0.3 | |
| HDMA | 116.21 | | | | | | | | | | | | | | | | | |
| HEA | 116.12 | 1 | | 1 | 1 | | 1.3 | 1.3 | 1 | 1 | 1 | | | | 1 | 1 | 1 | 1 |
| HEMA | 130.143 | | 1 | | | 1 | | | | | | | | | | | | |
| Ethylene glycol | 62.07 | | | | | | | | | | | | 1 | | | | | |
| AMG | 214.22 | | | | | | | | | | 1 | | | | | | | |
| IEA | 141.13 | | | | | | | | | | | | 0.5 | | | | | |
| Glycerol | 92.09 | | | | | | | | | | | | 0.5 | | | | | |
| 2-ethyl-1-hexylamine | 129.24 | | | 1 | | | | 0.7 | | | | | | | | | | 1 |

For purposes herein, an oligomer which possesses self-healing groups (such as, without limitation, oligomers 1-2, 4-6, and 8-17) may be considered as part of a self-healing component, whereas an oligomer without any self-healing groups (such as, without limitation, oligomer 3 and 7) would not be so-characterized.

The synthesis of the oligomers above which may be considered as part of a self-healing component are expected to be useful in a composition for coating an optical fiber, such as a primary coating composition for coating an optical fiber. To exhibit this further, a subset of these oligomers was used to create a variety of compositions, which were formulated and evaluated as described below. Such compositions below are formulated alongside appropriate controls utilizing select oligomers described above which do not contain self-healing groups.

Formulations 1-22

Each of the formulations described in Tables 3A-D was prepared by mixing a 100 g sample in a 100 ml mixing cup suitable for use with a SpeedMixer™. Specifically, the oligomer and monomer components were mixed in addition to the other components as specified in Tables 3A-3D below. The mixture was then premixed by hand to ensure the oligomer was well-mixed into the monomers used, after which the cup was closed and mixed in a SpeedMixer™ DAC150FVZ at 3500 rpm for 3 minutes. After this, the mixing operation was stopped, and the resulting mixture was transferred to a suitable receptacle and then heated to 75° C. in an oven and maintained at this temperature for about 1 hour to ensure complete dissolution of all components. The sample was then removed from the oven and mixed again for 3 additional minutes in the SpeedMixer again via the same method, after which the silyl acrylate was added, resulting in 100 g total. Finally, the mixture was mixed again for an additional 3 minutes in the SpeedMixer again via the same method.

These formulations were next characterized according to their respective content of UPy and (meth)acrylate groups per the methodology described below. Then, all formulations were tested according to the methods described below to determine their tensile strength, elongation percentage, segment modulus, toughness, viscosity, self-healing ability on film at multiple temperatures, and stress-relaxation %, respectively. Unless otherwise shown, values for UPy equivalents, (meth)acrylate equivalents, and disulfide equivalents are presented herein as rounded to three decimal places. Segment modulus and toughness values, meanwhile, have been rounded to 2 decimal places, with tensile strength presented as rounded to a single decimal place. Viscosity is presented to the nearest 1 centipoise unit. Film healing results are reported as a qualitative, binary "Yes" or "No" value. Finally, stress relaxation and film mechanical recovery values are presented as rounded to the nearest 1%. Values for each of these measured characteristics are reported in Tables 3A-3D below.

UPy Equivalents

The "UPy Equivalents" for a given composition was determined by first calculating the amount of moles of UPy groups in each UPy-containing component (Z) in accordance with the following expression:

$$Z = \frac{N \times Wt}{MM}$$

wherein Wt=the amount by weight of the respective component Z relative to 100 g of the total associated composition; N=the number of 2-ureido-4-pyrimidinone groups present in one molecule of component Z; and MM is the theoretical molecular mass of component Z (in g/mol). The theoretical molecular mass values for the reactants used in creating the oligomers (including the UPy-containing oligomers) of the formulations herein are reported in Table 2.

Then, the value for UPy Equivalents for the entire composition is calculated by adding up the values of moles of UPy groups for each UPy-containing component according to the following expression:

$$\sum_{i=1}^{n} Z_i = Z_1 + Z_2 + Z_3 + \ldots + Z_n$$

where n represents the number of UPy-containing components present in the formulation.

The values for UPy Equivalents may optionally be expressed as "UPy Milliequivalents" by multiplying the summed value by 1000, although unless specifically noted, the values herein are not reported in this fashion. For clarity, where "equivalents" or "milliequivalents" is specified herein, unless otherwise noted, the value is to be interpreted in reference to 100 g of the composition with which it is associated. UPy Equivalents values for each formulation is presented in Table 3A below.

It should be noted that if the complete recipe of a composition is not known ex ante, the equivalents of self-healing moieties may be determined analytically via any suitable method as will be appreciated by the skilled artisan to which this invention applies, such as via size exclusion chromatography (SEC), infrared spectroscopy, HPLC, MALDI-TOF mass spectrometry, or nuclear magnetic resonance (NMR) methods.

(Meth)acrylate Equivalents and Disulfide Equivalents

Values for (meth)acrylate equivalents and disulfide equivalents are determined via the same method as that prescribed for "UPy Equivalents" above, except for the fact that instead of assessing UPy groups or UPy-containing components, now (meth)acrylate groups (or disulfide groups as applicable) are counted. It is contemplated that if a given composition possesses both acrylate groups and methacrylate groups, the values will be summed together for purposes herein.

Viscosity

The viscosity was measured using Anton Paar Rheolab QC. The instrument was set up for the conventional Z3 system, which was used. For each measurement, samples in the amount of 14.7±0.2 g were loaded into a disposable aluminum cup. The sample in the cup was examined and if upon visual inspection it was determined to contain bubbles, the sample and cup were either subjected to centrifugation or allowed to sit long enough so that the bubbles would escape from the bulk of the liquid. Bubbles appearing at the top surface of the liquid were considered to be acceptable.

Next, the bob was gently loaded into the liquid in the measuring cup, after which the cup and bob were installed in the instrument. The sample temperature was allowed to equilibrate with the temperature of the circulating liquid (which itself was maintained at 25 degrees Celsius) by waiting five minutes. Then, the rotational speed was set to a certain value in order to produce the desired shear rate of 50 $\text{sec}^{-1}$.

After this, measurement readings were obtained. The instrument panel displayed a viscosity value, and if the viscosity value varied only slightly (less than 2% relative variation) for 15 seconds, the measurement was ceased. If greater than 2% relative variation was observed, the sample was allowed to equilibrate for an additional 5 minutes whereupon testing was resumed. If, upon the additional equilibration period, the sample variability remained, the shear rate would be modified according to well-known methods in the art to which this invention applies to more accurately capture the sample's viscous properties. The results reported represented the average viscosity values of three separate test samples. The values were recorded as expressed in millipascal seconds (mPa·s) and a shear rate of 50 $s^{-1}$ unless otherwise specified. The results for each example are reported in Table 3A-3D below, as appropriate.

Film Sample Preparation

To create films such that various physical properties could be tested, each sample was cured under a constant flow of nitrogen gas with a 1 $J/cm^2$ UV-dose of Conveyor Fusion Unit Model DRS-10/12 QN, 600 W UV-lamp system having as lamps 1600M radiator (600 W/inch which equals 240 W/cm, and thus, in total 600 W) fitted with R500 reflector, one with a H bulb and one with a D bulb UV lamp, of which the D-bulb was used to cure the samples. The UV-dose was then measured with an International Light IL390 radiometer.

Then, individual test strips having a width of approximately 1.27 cm (0.5 inches ±1/32") and a length of approximately 12.7 cm (5 inches±1/8") were then cut from the film. The exact thickness of each specimen was measured with a calibrated micrometer.

Tensile Strength, Elongation, Segment Modulus, and Toughness Test Method

The method for determining segment modulus as used herein is found in EP2089333B1, assigned to DSM IP Assets B.V., the relevant portions of which are hereby incorporated by reference in their entirety. The tensile properties (tensile strength, percent elongation at break, and segment modulus) were determined with an MTS Criterion™ Model 43.104 with respect to test strips of a cured film of each sample having a 3 mil thickness as prepared per the "Film Sample Preparation" procedure described above.

Due to these relatively soft coatings (e.g., those with a modulus of less than about 10 MPa), the coating was drawn down and cured on a glass plate and the individual specimens cut from the glass plate with a scalpel after applying a thin layer of talc. A 0.9 kg (2-lb) load cell was used in an Instron 4442 Tensile Tester, and the modulus was calculated at 2.5% elongation with a least-squares fit of the stress-strain plot. Cured films were conditioned at 23.0±0.1° C. and 50.0 0.5% relative humidity for 16 to 24 hours prior to testing.

For testing specimens, the gage length was 5.1 cm (2-inches) and the crosshead speed was 25.4 mm/min. All testing was performed at a temperature of 23.0±0.1° C. and a relative humidity of 50.0±0.5%. All measurements were determined from the average of at least 6 test specimens.

Values for Tensile Strength were determined as the highest stress born by the sample before break. Values for toughness were determined as the total area under the stress-strain curve.

Film Healing Test

First, with respect to each formulation as shown in the tables below, test strips of a 3 mil thick cured film were prepared per the "Film Sample Preparation" procedure as described above. Then, each test strip was cut in accordance with the schematic presented in FIG. 1 with an appropriately-sharpened (i.e. like new) scalpel having a blade thickness of less than or equal to 0.018 inches under a microscope objective (40× magnification) to view cut self-healing in real time. Healing was then assessed visually after each sample was maintained at room temperature (25° C.) for 5 minutes. Qualitative assessments of healing in this fashion were reported across the row headed by the phrase "Film Healing, 25° C."; if any observable amount of healing occurred under these conditions, the sample was graded with "YES"; if no observable healing had occurred, it was graded "NO" as reported in Tables 3A-3D below.

Then, each sample which had not already been graded with a "YES" was further heated to 55° C. using a Linkham LTS120 Temperature stage under a microscope objective (at 40× magnification) for a further visual assessment. Healing was again qualitatively determined visually after maintaining each sample at a temperature of 55° C. for 5 minutes. The same criteria for determining "YES" and "NO" were applied to the samples in this instance as with respect to the room temperature healing test. The results are reported in Table 3A, 3B, and 3D as appropriate under the row headed by the phrase "Film Healing, 55° C.", with the further understanding that samples which exhibited self-healing at room temperature were automatically graded with a "YES" designation under the 55° C. condition test (without measurement), it being understood that the healing behavior at 55° C. exceeds that at room temperature.

Stress Relaxation Test

First, with respect to each formulation as indicated in the tables below, test strips of a 3 mil thick cured film were prepared per the "Film Sample Preparation" procedure as described above. After this, the strips were conditioned at 50% relative humidity and 23° C. overnight. The exact thickness was measured with a calibrated micrometer, and the exact width was measured via optical microscopy at 4× magnification. Samples were tested in a Dynamic Mechanical Analyzer (DMA) in a "wide strip" geometry with a 0.79 inch testing length and by mounting 1 gram of pretension held by screws and secured with a torque driver to 20cN·m. The samples were tested isothermally at room temperature and held at the specified strain (2% for Table 3A and Table 3D; 1.5% for Tables 3B and 3C) for 100 seconds while measuring stress with a sampling rate of 8 points/sec. Samples were run in duplicate and averaged. Values for the total percentage of stress reduction from 1 second to 10 seconds are reported in Tables 3A-3D below.

Film Mechanical Recovery Test

First, with respect to each formulation as indicated in Table 3D below, two 3 mil thick cured films were prepared per the "Film Sample Preparation" procedure as described above, with the exception that the test strips were not cut immediately from the films. For the avoidance of doubt, for each test, both films were prepared not only from the same recipe, but also the same actual batch of the prepared starting material. One film was then cut in accordance with the procedure outlined in the "Film Healing Test" described above. The other film was not cut.

Both films were left to heal overnight (for 12-14 hours) at 50% relative humidity and 23° C. overnight or in an oven at 55° C. (as specified in Table 3D). The cut films were not otherwise handled or altered in any way after the cut was created.

After completion of the 12-14 hour healing period, the films were cut into test strips per the "Film Sample Preparation" procedure as described above. The tensile strength of resultant strips from the uncut film was then measured per the method as described above, with the value recorded (referred to herein as "pre-cut tensile strength"). The tensile strength of the cut test strip was then determined, again in accordance with the procedure as outlined elsewhere herein, above. If the sample had been left to heal at 55° C., it was allowed to equilibrate to room temperature (over the course of about 30 minutes) first prior to taking the tensile strength measurement. The value obtained was then recorded (referred to herein as "post-cut tensile strength").

The Film Mechanical Recovery values reported in Table 3D below represent the measured post-cut tensile strength value divided by the measured pre-cut tensile strength value for each composition, expressed as a percentage to the nearest whole 1 percent. Where the sample did not exhibit any healing and no post-cut tensile strength could be measured, the value was reported simply as 0%.

TABLE 3A

Formulations 1-10. All amounts listed in parts by weight.

| Formulation | 1 | 2 | 3 | 4 | 5 | 6 | 7 | 8 | 9 | 10 |
|---|---|---|---|---|---|---|---|---|---|---|
| Oligomer 1 | 65 | | 70 | | 65 | | | | | |
| Oligomer 3 | | 65 | | 70 | | 65 | | | | |
| Oligomer 6 | | | | | | | 85 | | 70 | |
| Oligomer 7 | | | | | | | | 85 | | 70 |
| EOEOEA | 27.2 | 27.2 | 22.2 | 22.2 | 25.7 | 25.7 | | | 22.2 | 22.2 |
| HEA | | | | | | | 7.2 | 7.2 | | |
| TMPTA | 0.5 | 0.5 | 0.5 | 0.5 | 2 | 2 | 0.5 | 0.5 | 0.5 | 0.5 |
| VC | 5 | 5 | 5 | 5 | 5 | 5 | 5 | 5 | 5 | 5 |
| TPO | 1.2 | 1.2 | 1.2 | 1.2 | 1.2 | 1.2 | 1.2 | 1.2 | 1.2 | 1.2 |
| Irganox 1035 | 0.6 | 0.6 | 0.6 | 0.6 | 0.6 | 0.6 | 0.6 | 0.6 | 0.6 | 0.6 |
| Silyl Acrylate | 0.5 | 0.5 | 0.5 | 0.5 | 0.5 | 0.5 | 0.5 | 0.5 | 0.5 | 0.5 |
| TOTALS | 100 | 100 | 100 | 100 | 100 | 100 | 100 | 100 | 100 | 100 |
| UPy Equivalents | 0.039 | 0 | 0.042 | 0 | 0.039 | 0 | 0.039 | 0 | 0.032 | 0 |
| (Meth)Acrylate Equivalents | 0.227 | 0.227 | 0.203 | 0.203 | 0.234 | 0.234 | 0.162 | 0.162 | 0.208 | 0.208 |
| Tensile Strength (MPa) | 0.3 | 0.1 | 0.3 | 0.1 | 0.3 | 0.1 | 1.3 | 1.4 | 0.5 | 0.4 |
| Elongation (%) | 132 | 60 | 128 | 48 | 67 | 33 | 130 | 130 | 75 | 52 |
| Segment Modulus (MPa) | 0.71 | 0.27 | 0.77 | 0.27 | 1.0 | 0.44 | 3.99 | 1.79 | 1.34 | 1.13 |
| Toughness (N*mm/mm$^3$) | 0.22 | 0.05 | 0.24 | 0.01 | 0.10 | 0.01 | 1.00 | 1.00 | 0.20 | 0.14 |

TABLE 3A-continued

Formulations 1-10. All amounts listed in parts by weight.

| Formulation | 1 | 2 | 3 | 4 | 5 | 6 | 7 | 8 | 9 | 10 |
|---|---|---|---|---|---|---|---|---|---|---|
| Viscosity (cPs) | 5773 | 737 | 11030 | 1298 | 8631 | 787 | 143800 | 16669 | 8669 | 1527 |
| Film Healing, 25° C. | Yes | No | Yes | No | No | No | Yes | No | No | No |
| Film Healing, 55° C. | Yes | No | Yes | No | No | No | Yes | No | Yes | No |
| Stress Relaxation, 2% (1-10 sec, %) | No data | No data | 60 | 4 | 55 | 6 | No data | No data | No data | No data |

TABLE 3B

Formulations 11-17. All amounts listed in parts by weight.

| Formulation | 11 | 12 | 13 | 14 | 15 | 16 | 17 |
|---|---|---|---|---|---|---|---|
| Oligomer 9 | 80 | | | | | | |
| Oligomer 17 | | 50 | | | 75 | | |
| Oligomer 12 | | | 60 | | | | |
| Oligomer 11 | | | | 60 | | | |
| Oligomer 15 | | | | | | | 65 |
| Oligomer 10 | | | | | | 55.69 | |
| EOEOEA | 12.2 | 42.2 | 32.2 | 32.2 | 17.2 | 35.7 | 27.2 |
| TMPTA | 0.5 | 0.5 | 0.5 | 0.5 | 0.5 | 0.55 | 0.5 |
| VC | 5 | 5 | 5 | 5 | 5 | 5.5 | 5 |
| TPO | 1.2 | 1.2 | 1.2 | 1.2 | 1.2 | 1.33 | 1.2 |
| Irganox 1035 | 0.6 | 0.6 | 0.6 | 0.6 | 0.6 | 0.66 | 0.6 |
| Silyl Acrylate | 0.5 | 0.5 | 0.5 | 0.5 | 0.5 | 0.55 | 0.5 |
| TOTALS | 100 | 100 | 100 | 100 | 100 | 100 | 100 |
| UPy Equivalents | 0.023 | 0 | 0.033 | 0.033 | 0 | 0.043 | 0.021 |
| Disulfide Equivalents | | 0.061 | | | 0.091 | 0.043 | |
| (Meth)Acrylate Equivalents | 0.138 | 0.328 | 0.232 | 0.283 | 0.226 | 0.257 | 0.214 |
| Tensile Strength (MPa) | 0.1 | 0.5 | 0.1 | 0.1 | 0.2 | 1.4 | 0.2 |
| Elongation (%) | 60 | 58 | 56 | 19 | 29 | 210 | 123 |
| Segment Modulus (MPa) | 0.31 | 1.46 | 0.25 | 0.29 | 1.11 | 4.0 | 0.42 |
| Toughness (N*mm/mm$^3$) | 0.05 | 0.30 | 0.03 | 0.01 | 0.04 | 1.52 | 0.13 |
| Viscosity (cPs) | 4299 | No data | 8086 | 6868 | 12826 | 1744 | 4925 |
| Film Healing, 25° C. | No | No | Yes | Yes | No | Yes | Yes |
| Film Healing, 55° C. | Yes | No | Yes | Yes | No | Yes | Yes |
| Stress Relaxation, 1.5% (1-10 s, %) | 27 | 16 | 41 | 39 | 50 | 61 | 32 |

TABLE 3C

Formulations 18-22. All amounts listed in parts by weight.

| Formulation | 18 | 19 | 20 | 21 | 22 |
|---|---|---|---|---|---|
| Oligomer 1 | 70 | 46.7 | 35 | 23.3 | |
| Oligomer 3 | | 23.3 | 35 | 46.7 | 70 |
| EOEOEA | 22.2 | | | | 22.2 |
| TMPTA | 0.5 | 0.5 | 0.5 | 0.5 | 0.5 |
| VC | 5 | 5 | 5 | 5 | 5 |
| TPO | 1.2 | 1.2 | 1.2 | 1.2 | 1.2 |
| Irganox 1035 | 0.6 | 0.6 | 0.6 | 0.6 | 0.6 |
| Silyl Acrylate | 0.5 | 0.5 | 0.5 | 0.5 | 0.5 |
| TOTALS | 100 | 100 | 100 | 100 | 100 |
| UPy Equivalents | 0.042 | 0.027 | 0.021 | 0.014 | 0 |
| (Meth)Acrylate Equivalents | 0.203 | 0.203 | 0.203 | 0.203 | 0.203 |
| Tensile Strength (MPa) | 0.5 | 0.3 | 0.3 | 0.2 | 0.3 |
| Elongation (%) | 124 | 83 | 93 | 75 | 79 |
| Segment Modulus (MPa) | 0.88 | 0.60 | 0.47 | 0.40 | 0.26 |
| Viscosity (cPs) | 10959 | No data | No data | No data | 7840 |
| Film Healing, 25° C. | Yes | No data | No data | No data | No |
| Stress Relaxation, 1.5% (1-10 s, %) | 39 | 34 | 29 | 20 | 4 |

TABLE 3D

Mechanical recovery of select formulations. All amounts listed in parts by weight.

| Formulation | 3 | 4 | 9 | 10 |
|---|---|---|---|---|
| Oligomer 1 | 70 | | | |
| Oligomer 3 | | 70 | | |
| Oligomer 6 | | | 70 | |
| Oligomer 7 | | | | 70 |
| EOEOEA | 22.2 | 22.2 | 22.2 | 22.2 |
| 2-HEA | | | | |
| TMPTA | 0.5 | 0.5 | 0.5 | 0.5 |
| VC | 5 | 5 | 5 | 5 |
| TPO | 1.2 | 1.2 | 1.2 | 1.2 |
| Irganox 1035 | 0.6 | 0.6 | 0.6 | 0.6 |
| Silyl Acrylate | 0.5 | 0.5 | 0.5 | 0.5 |
| TOTALS | 100 | 100 | 100 | 100 |
| UPy Equivalents | 0.042 | 0 | 0.032 | 0 |
| (Meth)Acrylate Equivalents | 0.203 | 0.203 | 0.208 | 0.208 |
| Tensile Strength (MPa) | 0.3 | 0.1 | 0.5 | 0.4 |
| Elongation (%) | 128 | 48 | 75 | 52 |
| Segment Modulus (MPa) | 0.77 | 0.27 | 1.34 | 1.13 |
| Toughness (N*mm/mm$^3$) | 0.24 | 0.01 | 0.20 | 0.14 |
| Viscosity (cPs) | 11030 | 1298 | 8669 | 1527 |

TABLE 3D-continued

Mechanical recovery of select formulations.
All amounts listed in parts by weight.

| Formulation | 3 | 4 | 9 | 10 |
|---|---|---|---|---|
| Film Healing, 25° C. | Yes | No | No | No |
| Film Healing, 55° C. | Yes | No | Yes | No |
| Stress Relaxation, 2% (1-10 sec, %) | 60 | 4 | No data | No data |
| Film Mechanical Recovery (23 C. Overnight), % | 78 | 0 | 13 | 0 |
| Film Mechanical Recovery (55 C. Overnight), % | No data | 0 | 52 | 0 |

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A multi-layered optical device comprising:
a polymeric layer disposed between a first optical element layer and a second optical element layer, wherein each of the polymeric layer, the first optical element layer, and the second optical element layer comprise a first surface and a second surface, wherein the first surface of the polymeric layer is in contact with the first surface of the first optical element layer and the second surface of the polymeric layer is in contact with the first surface of the second optical element layer,
wherein the polymeric layer comprises a product of a composition comprising a self-healing component, wherein said self-healing component consists essentially of molecules comprising self-healing moieties, wherein said composition possesses either:
(a) greater than 30 wt. %, relative to the weight of the entire composition, of the self-healing component; or
(b) greater than 0.015 equivalents of self-healing moieties per 100g of the composition.

2. The multi-layered optical device of claim 1, wherein the first optical element layer and/or the second optical element layer are constructed from a material selected from the group consisting of glass, organic materials including polymers and organometallic materials.

3. The multi-layered optical device of claim 1, wherein the first optical element layer, the second optical element layer, or both, are coatings from vapor deposition including metals and metal oxides.

4. The multi-layered optical device of claim 1, wherein the first surface of the polymeric layer is chemically bonded to the first surface of the first optical element layer, and the second surface of the polymeric layer is chemically bonded to the first surface of the second optical element layer.

5. The multi-layered optical device of claim 1, wherein the polymeric layer is configured to possess a light transmittance of greater than or equal to 80%, when tested according to ISO 13468-1:2019.

6. The multi-layered optical device of claim 1, wherein the polymeric layer has a thickness of less than or equal to 500 microns.

7. The multi-layered optical device of claim 1, wherein the composition possesses a glass transition temperature of less than 150° C.

8. The multi-layered optical device of claim 1, wherein the composition is UV-or thermally-curable.

9. The multi-layered optical device of claim 1, wherein the composition further comprises:
optionally, a monomer component;
optionally, an oligomer component
an initiator component, wherein the initiator component optionally comprises a photoinitiator; and/or
additives, wherein the additives optionally comprise adhesion promoters, UV absorbers, hindered amine stabilizers, antioxidant, photochromic dyes, thermochromic dyes, liquid crystals, laser dyes, fluorescent dyes, OLED materials, dichroic dyes, or fillers, wherein the fillers optionally comprise thermally- or electrically-conductive fillers; and,
wherein relative to the weight of the entire composition, the monomer and/or oligomer component is present from 10 wt. % to 65 wt. %;
the self-healing component is present from greater than 30 wt. % to 100 wt. %;
the initiator is present from 0.01 wt. % to 10 wt. %;
and the additives are present from 0 wt. % to 59.99 wt. %;
wherein each of the components adds up to 100 wt. %.

10. The multi-layered optical device of claim 1, wherein the self-healing component comprises molecules according to structure (VI):

$$[A(G)_n\text{-}D_m]\text{-}[A(G)_{n-1}\text{-}D_m]_k\text{-}Z \qquad \text{(VI)};$$

wherein

A is carbon or nitrogen;

wherein when A is an sp3 carbon, n=3, and when A is an sp2 carbon or a nitrogen, n=2;

m is an integer from 0 to 500;

k is a number from 0-20;

D is, for each occurrence of m, a divalent spacer independently chosen from—O—; —C(O)—;-Aryl-;—C=C—;—N=N—;—S—;—S(O)—;—S(O) (O)—; —(CT$_2$)$_i$—; N (T);—Si (T)$_2$ (CH$_2$);—;—(Si (T)$_2$O);—;—C(T)—C(T)—; C (T)—N—;—C(T)=;—N=; or combinations thereof;

wherein
for each instance in D of a single bond, a single bond is connected thereto, and for each instance in D of a double bond, a double bond is connected thereto;

wherein
each T is selected for each occurrence from single valent units including hydrogen, F, Cl, Br, I, C$_1$—C$_8$ alkyl, C$_1$—C$_8$ alkoxy, substituted amino, or substituted aryl;

wherein each T can also be selected from divalent D$_m$ and connects to another divalent T that's also selected from D$_m$ and form a ring structure; and i is an integer from 1-40;

wherein each group for each unit of m, n, and k can be the same or different;

Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylate, hydrogen, F, Cl, Br, I, or maleimido group; and G is, for each occurrence of n, independently selected from hydrogen, Z, or a self-healing moiety according to the following structure (VI-b):

(Z—D$_m$)$_j$X—D$_m$—    (VI-b);

wherein
X is a multi-hydrogen bonding group, a disulfide group, or a urea group;
j=1 when X is divalent, and j=0 when X is monovalent;
wherein for at least one occurrence of n, G is a self-healing moiety according to structure (VI-b).

11. The multi-layered optical device of claim 10, wherein X comprises disulfide groups and/or urea groups, and j=1, and wherein the molecule according to structure (VI) possesses a theoretical molecular weight, MW$_{theo}$, of between 500 and 100,000 g/mol.

12. The multi-layered optical device of claim 10, wherein X is a 2-ureido-4-pyrimidinone (UPy) group, and j=0; wherein the UPy group is the reaction product of 2-amino-4-hydroxy-6-methyl-pyrimidine; and
wherein D comprises a urethane group, wherein the urethane group is the reaction product of a diisocyanate compound.

13. The multi-layered optical device of claim 1, wherein the self-healing moieties are self-complementary, wherein a bond dissociation energy between two complementary self-healing moieties is between 9 kcal/mol to 100 kcal/mol, wherein bond dissociation energy is calculated as a direct addition summary of all bonds between complementary self-healing moieties in accordance with Table 1 of The Scientific World JOURNAL (2004) 4, 1074-1082, and references cited therein; and Nature 2002, volume 3, 836-847, and references cited therein.

14. The multi-layered optical device of claim 1, wherein the self-healing moieties comprise multi-hydrogen bonding materials, wherein the multi-hydrogen bonding materials optionally comprise 2-ureido-4-pyrimidinone (UPy) groups.

15. The multi-layered optical device of claim 1, wherein the self-healing component comprises molecules according to structure (VII):

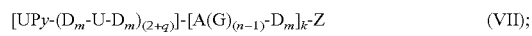

[UPy-(D$_m$-U-D$_m$)$_{(2+q)}$]-[A(G)$_{(n-1)}$-D$_m$]$_k$-Z    (VII);

wherein
UPy represents a UPy group, wherein the UPy group is a 2-ureido-4-pyrimidinone;
U represents—NHC (O) E-or-EC (O) NH—, wherein E is O, NH, N (alkyl), or S;
q is a number greater than or equal to 0 and less than or equal to 10;
k is a number from 0 to 20;
A is selected from carbon and nitrogen;
n is 2 or 3, wherein when A is an sp3 carbon, n=3, and when A is an sp2 carbon or a nitrogen, n=2;
m is an integer from 0 to 500;
D is, for each occurrence of m, a divalent spacer independently chosen from—O—,—C (O)—,-Aryl-,—C=C—,—N=N—,—S—,—S(O)—,—S (O) (O)—, (CT$_2$)$_i$—,—N(T)—,—Si (T)$_2$ (CH$_2$)$_i$—,—(Si (T)$_2$O )$_i$—,—C(T)=C (T)—, —C(T)=N—,—C(T)=,—N=, or combinations thereof;

wherein
for each instance in D of a single bond, a single bond is connected thereto, and for each instance in D of a double bond, a double bond is connected thereto;
wherein each T is selected for each occurrence from single valent units including hydrogen, F, Cl, Br, I, C$_1$—C$_8$ alkyl, C$_1$—C$_8$ alkoxy, substituted amino, or substituted aryl;
wherein each T can also be selected from divalent D$_m$ and connects to another divalent T that's also selected from D$_m$ and form a ring structure; and
i is an integer from 1-40;
Z is chosen from a hydrogen, acryloyloxy, methacryloyloxy, hydroxy, amino, vinyl, alkynyl, azido, silyl, siloxy, silylhydride, thio, isocyanato, protected isocyanato, epoxy, aziridino, carboxylate, hydrogen, F, Cl, Br, I, or maleimido group; and
G is, for each occurrence of n, independently selected from hydrogen,—D$_m$-Z, or a self-healing moiety according to the following structure (VII-b):

(Z—D$_m$)$_j$X—D$_m$—    (VII-b);

wherein
X is a multi-hydrogen bonding group, a disulfide group, or a urea group;
j=1 when X is divalent, and j=0 when X is monovalent; and
wherein the oligomer possesses greater than 0.022 equivalents of UPy groups per 100 grams of the oligomer.

16. The multi-layered optical device of claim 1, wherein the composition possesses from 0.015 to 0.5 equivalents of self-healing groups per 100g of the composition.

17. The multi-layered optical device of claim 1, wherein the multi-layered optical device is flat, curved, or cylindrical; and
wherein the multi-layered optical device is an optical fiber, beam splitter, solar panel, antireflection coating, electronic display part, optical lens, optical film, polarizing optics, window, optical filter, lighting device, ophthalmic lens, photochromic lens, microscopy lens, laser mirror, or imaging lens.

18. The multi-layered optical device of claim 1, further comprising a third or more optical element layer, wherein at least one optical element layer is in contact with either the second surface of the first optical element layer or the second surface of the second optical element layer.

19. The multi-layered optical device of claim 1, wherein the molecules comprising self-healing moieties comprise a reactive urethane oligomer having a backbone derived from a polyether polyol, a polyester polyol, a poly (dimethylsiloxane), a disulfide polyol, or a combination thereof.

20. The multi-layered optical device of claim 1, wherein the molecules comprising self-healing moieties have a theoretical molecular weight ($MW_{theo}$) of between 500 and 2000 g/mol and further comprise urethane linking groups.

\* \* \* \* \*